United States Patent
Jamieson et al.

(10) Patent No.: US 6,952,808 B1
(45) Date of Patent: Oct. 4, 2005

(54) PROCESS VARIABLE GAUGE INTERFACE AND METHODS REGARDING SAME

(75) Inventors: Gregory A. Jamieson, Fridley, MN (US); Stephanie A. E. Guerlain, White Bear Lake, MN (US); Peter T. Bullemer, Golden Valley, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/346,412

(22) Filed: Jul. 1, 1999

(51) Int. Cl.$^7$ ................................................ G09G 5/00
(52) U.S. Cl. ..................... 715/833; 715/965; 715/970; 715/771; 715/764
(58) Field of Search ............................. 345/440, 440.1, 345/440.2, 965, 970, 771, 764; 700/83; 702/127, 128

(56) References Cited

U.S. PATENT DOCUMENTS

| | | | |
|---|---|---|---|
| 4,344,145 A | * | 8/1982 | Chasek ........................ 364/551 |
| 4,517,637 A | * | 5/1985 | Cassell ........................ 364/238 |
| 4,675,147 A | * | 6/1987 | Schaefer et al. ............. 376/245 |
| 4,745,543 A | * | 5/1988 | Michener et al. ........... 364/188 |
| 5,226,118 A | | 7/1993 | Baker et al. |
| 5,311,562 A | | 5/1994 | Palusamy et al. |
| 5,347,446 A | | 9/1994 | Iino et al. |
| 5,351,184 A | | 9/1994 | Lu et al. |
| 5,375,199 A | * | 12/1994 | Harrow et al. ............... 345/159 |
| 5,408,406 A | | 4/1995 | Mathur et al. |
| 5,428,555 A | * | 6/1995 | Starkey et al. ......... 364/551.01 |
| 5,572,420 A | | 11/1996 | Lu |
| 5,630,164 A | * | 5/1997 | Williams et al. ............ 395/800 |
| 5,631,825 A | * | 5/1997 | van Weele et al. ......... 364/188 |
| 5,742,500 A | | 4/1998 | Irvin |
| 5,748,495 A | | 5/1998 | Arita et al. |
| 5,768,119 A | | 6/1998 | Havekost et al. |
| 5,838,588 A | | 11/1998 | Santoso et al. |
| 5,859,885 A | | 1/1999 | Rusnica et al. |
| 5,936,622 A | | 8/1999 | Halverson et al. |
| 6,032,122 A | * | 2/2000 | Gertmer et al. ................ 705/8 |
| 6,122,603 A | * | 9/2000 | Budike, Jr. .................. 702/182 |
| 6,577,323 B1 | | 6/2003 | Jamieson et al. |
| 6,587,108 B1 | | 7/2003 | Guerlain et al. |

FOREIGN PATENT DOCUMENTS

| | | |
|---|---|---|
| DE | 9110348 U | 11/1991 |
| EP | 0432138 A | 6/1991 |
| WO | 9722072 A | 6/1997 |

OTHER PUBLICATIONS

Bakshi et al., "Representation of Process Trends–III. Multiscale Extraction of Trends from Process Data," *Computer & Chemical Engineering*, 18(4), pp. 267–302 (1994).

Beuthel et al., "Advantages of Mass–Data–Displays in Process S&C," *Analysis, Design and Evaluation of Man–Machine Systems 1995*, (A Postprint volume from the IFAC Symposium Cambridge, Massachusetts), 2, pp. 383–388 (1995).

(Continued)

*Primary Examiner*—Ba Huynh
*Assistant Examiner*—Mylinh Tran
(74) *Attorney, Agent, or Firm*—Mueting, Raasch & Gebhart, P.A.

(57) ABSTRACT

A graphical user interface for providing real-time process information to a user with regard to a process that is operable under control of one or more process variables includes a scale extending along a gauge axis and one or more bars extending along the gauge axis. Each bar is representative of a set of high and low process limit values for a process variable. Further, the graphical user interface includes a graphical shape displayed along the gauge axis representative of a current value of the process variable. A computer implemented method for providing the graphical user interface is also provided.

51 Claims, 12 Drawing Sheets

OTHER PUBLICATIONS

Cheung et al., "Representation of Process Trends. Part I. A Formal Representation Framework," *Computers & Chemical Engineering*, 14(4/5), pp. 495–510 (1990).

Janusz et al., "Automatic Generation of Qualitative Descriptions of Process Trends for Fault Detection and Diagnosis," *Engng. Applic. Artif. Intell.*, 4(5), pp. 329–339 (1991).

Lambert et al., "Design Of a New Human–Machine System For the Supervision Of a Highly Automated Continuous Process," *SMC'98*, San Diego, 6 pgs.(1998).

Lambert et al., "Design of a New Interface for The Supervision of a Nuclear Fuel Reprocessing System," *Time And Space In Process Control*, CSAPC'97, pp. 195–199 (1997).

Lambert et al., "Design of a New Supervision System Involving New Man–Machine Interactions," *Computational Engineering in Systems Applications* IMACS Multiconference, Nabeul–Hammamet, Tunisia, 7 pgs. (Apr. 1–4, 1998).

Lambert et al., "Realization and Evaluation of a New Kind of Supervisory System," *Preprints of the 7th IFAC/IFIP/IFORS/IEA Symposium on Analysis, Design and Evaluation of Man–Machine Systems*, Koyto, Japan, pp. 455–460 (Sep. 16–18, 1998).

Rengaswamy et al., "A Syntactic Pattern–Recognition Approach for Process Monitoring and Fault Diagnosis," *Engng. Applic. Artif. Intell*, 8(1), pp. 35–51 (1995).

"Robust Multivariable Predictive Control Technology–RM-PCT Users Guide for TPS," Honeywell product publication, pp. 1–147 (Jun. 1997).

Xia, "Similarity Search in Time Series Data Sets," M.S. Thesis, Simon Fraser University, pp. 1–97 (1997).

* cited by examiner

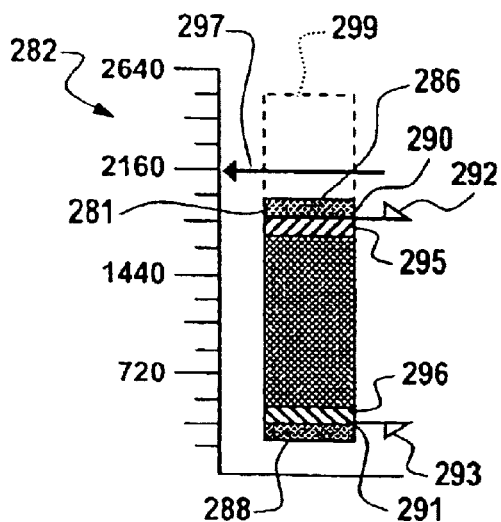
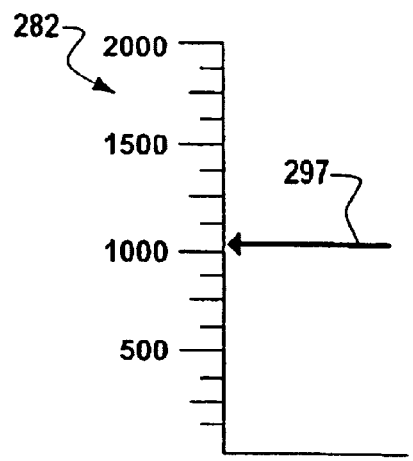
*Figure 7D*  *Figure 7E*
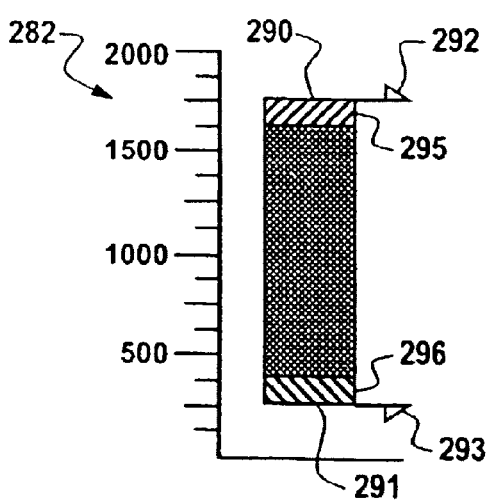
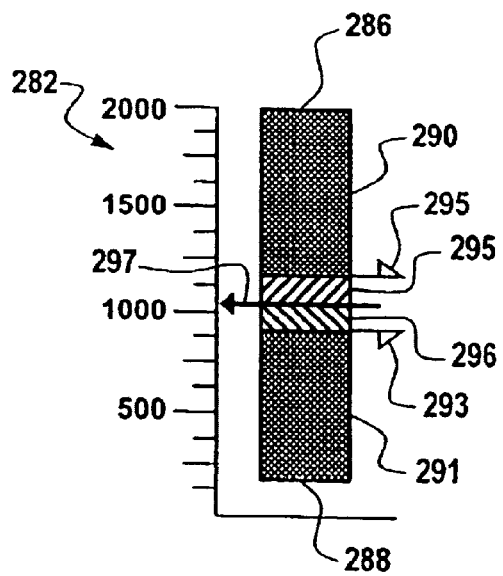
*Figure 7F*  *Figure 7G*

PROCESS VARIABLE GAUGE INTERFACE AND METHODS REGARDING SAME

FIELD OF THE INVENTION

The present invention is generally related to process control. More particularly, the present invention pertains to graphical user interfaces and displays for process control.

BACKGROUND OF THE INVENTION

Display technologies are emerging which have importance for a variety of applications. For example, various graphical user interfaces and displays have been developed for personal computing, financial services applications, etc. Recent advances in hardware and software technologies enable the development of powerful graphical user interfaces.

Various types of process control systems are presently in use, such as for control of processes operable under control of a single variable to processes controlled using controllers capable of controlling multiple variables. Control of a process is often implemented using microprocessor-based controllers, computers, or workstations which monitor the process by sending and receiving commands and data to hardware devices to control either a particular aspect of the process or the entire process as a whole. For example, many process control systems use instruments, control devices, and communication systems to monitor and manipulate control elements, such as valves and switches, to maintain one or more process variable values (e.g., temperature, pressure, flow, and the like) at selected target values. The process variables are selected and controlled to achieve a desired process objective, such as attaining a safe and efficient operation of machines and equipment utilized in the process. Process control systems have widespread application in the automation of industrial processes such as, for example, the processes used in chemical, petroleum, and manufacturing industries.

In recent years, advanced process control systems for controlling multivariable processes have been developed. For example, one type of process control is based on configuring or programming advanced controls based on engineer(s) knowledge (e.g., incorporating feed forward, signal selection, and calculation blocks) to continually push a process plant toward some known operating state. Another type of advanced process control is model-based predictive control. Model-based predictive control techniques have gained acceptance in the process industry due to their ability to achieve multivariable control objectives in the presence of dead time, process constraints, and modeling uncertainties.

In general, model-based predictive control techniques include algorithms which compute control moves as a solution to an optimization problem for minimizing errors subject to constraints, either user imposed or system imposed. A model-based predictive control algorithm can be generally described with reference to a multivariable process. Generally, the model-based predictive control includes two major portions: first, an optimization program is used to define the best place to run the process at steady state, and, second, a dynamic control algorithm defines how to move the process to the steady state optimum in a smooth way without violating any constraints. For example, at a specified frequency, e.g., every minute, the optimizer looks at the current state of the process and calculates a new optimum. From the optimizer, the controller knows where process variables should be in the final steady state. The control algorithm then calculates a dynamic set of changes for the process variables to move the process in a smooth way to the steady state with no dynamic violations of constraints. For example, 60–120 control moves may be calculated out into the future for a process variable. Generally, one of the calculated control moves is implemented and the rest thrown away. These steps are then reiterated. The control objective for the model-based predictive control is generally to provide for optimum controlled variables through calculation using a model based on economic values.

Model-based predictive control is performed using products available from several companies. For example, model based predictive control is performed by a Dynamic Matrix Control (DMC) product available from Aspen Tech (Cambridge, Mass.), and by a Robust Multivariable Predictive Control Technology (RMPCT) product available from Honeywell Inc. (Minneapolis, Minn.) which is a multi-input, multi-output control application product that controls and optimizes highly interactive industrial processes such as when used in suitable automated control systems.

Generally, a model-based predictive controller contains three types of variables; namely, controlled variables (CVs), manipulated variables (MVs), and disturbance variables (DVs) (sometimes also referred to as feed forward variables (FFs)). Controlled variables are those variables that the controller is trying to keep within constraints. Further, it may also be desirable to minimize or maximize some of the controlled variables (e.g., maximize the feed throughput process variable). Manipulated variables are those variables, such as valves, that the controller can open and close to try to achieve an objective of the controller (e.g., maximizing feed throughput) while maintaining all of the controlled variables within their constraints. Disturbance variables are those variables that can be measured, but not controlled. Disturbance variables assist the controller by providing needed information such as information regarding certain factors, e.g., outside air temperature. The controller can then recognize how such factors will affect other process variables in the controller, so as to better predict how the plant will react to measured disturbances.

A user of the model-based predictive controller (e.g., an engineer, an operator, etc.) has conventionally been provided with various types of information regarding the various process variables including information concerning the controlled variables, manipulated variables, and disturbance variables. For example, information such as predicted values, current values, and other relational information of variables relative to other variables has been provided to a user in the past by way of various interfaces and displays. The user can monitor such information and interact with the controller in various ways. For example, the user can turn the controller on and off, take individual process variables in and out of control, change various types of limits placed on process variables contained in the controller (e.g., change low or high limits for individual process variables), change the model of the controller, etc.

However, in order for the user to monitor the overall health of the controller effectively, and to interact with the controller in the required manner (e.g., changing limits of process variables), the user must be presented with suitable controller information. For example, an operator monitoring the controller should be presented with information regarding the relationship between manipulated variables and controlled variables, the limits to which process variables are constrained, the current values of the various process variables, etc. Such information should be presented in such a manner that a user can effectively understand the performance of the process and, for example, be able to detect and solve problems in the process. Although various types of screen displays have been used to present information regarding the controller to a user (e.g., those described in the Honeywell product publication entitled "Robust Multivariable Predictive Control Technology-RMPCT Users Guide for TPS (6/97) hereby incorporated herein by reference in its entirety and hereinafter referred to as "Honeywell Users Guide") such that the user can monitor and manipulate parameters related to one or more process variables in the process being controlled thereby, the effectiveness of such an interface has been lacking and the users may have difficulties performing the required monitoring and control functions.

For example, one difficulty of monitoring multiple dynamic process variables in parallel is that generally a large amount of screen real estate needs to be devoted to the presentation of textual data with respect to such process variables. For example, this is particularly a problem facing operators of nuclear, chemical, and petrochemical plants where the number of dynamic process variables is large. In general, a conventional solution to this multivariable monitoring problem is the use of trend history plots that display the historical behavior of one or more variables. However, this approach is still too real estate intensive in that it requires a great deal of space to display multiple trend history plots in parallel even for just a few process variables. As such, users are typically forced to access at least some of the trend history plots for the process variables in a serial manner.

Further, for example, a user in a model-based predictive control process must be able to deduce potential causes of observed controlled variable changes and assist the users in predicting the effects of any planned manipulated variable manipulations, e.g., change of constraints or limits for a manipulated variable. One particularly beneficial screen display currently used for such analysis is a matrix table that displays a gain relationship between controlled variables and manipulated variables. For example, a gains matrix screen displaying gain values is currently available as shown in the Honeywell Users Guide. However, such displays do not provide adequate information and tools to use the matrix screen to support the user in problem solving tasks. In fact, generally, only process engineers and not operators of the controllers make frequent use of the tables.

Yet further, for example, model-based predictive controllers generally are constraint-based tools as are various other controllers, e.g., the controllers attempt to control a process within certain constraints or limits defined for process variables being controlled. The use of such constraint-based techniques for controlling the process presents the problematic task of being able to monitor or keep track of the relationships between the various constraint limits and the current values for one process variable or a multiple number of process variables. For example, in a model-based predictive controller, engineering hard limits, operator set limits, engineering physical limits, and/or various other limits may be specified for a number of different process variables. A user is generally required to monitor the relationships of a large number of process variables. Traditionally, information to carry out such monitoring is by presentation of such information in textual form. For example, a user is presented with tabular values representative of engineering high and low hard limits in addition to the current value for a process variable. The user is then required to read the text and formulate the relationship between the relevant limits and current value. When monitoring a large number of such process variables, the task of formulating such relationships is difficult.

In addition, for example, a user may be required to effectively monitor and manipulate parameters for a process variable, e.g., the setting of operator high and low limits for a process variable. Currently, interface techniques used to present information to the user and provide the user a way of changing one or more parameters of a process variable have been ineffective. For example, typically a user relies primarily on tabular presentation of data with respect to a particular process variable, e.g., color-coded tabular presentation of textual material. However, in one particular case, some graphical elements have been used to show one or more subsets of information, such as limits and current values, with supporting text, for use in monitoring and manipulating a process variable. However, such approaches suffer from at least three problems. First, they are difficult to use, either because they necessitate extensive cognitive manipulation of quantitative data or because they are incomplete in their integration. For example, when some graphics have been used with textual material, the graphics have not effectively presented such information to the user. For example, a graph including a separate pair of lines indicating limits for a process variable, a separate bar representing operator set high and low limits for the process variable, a separate line representing a present value of the process variable, and clamping limits within the other limits have been used to display characteristics of the particular process variable. However, such separate display of the elements lacks integration for easy monitoring of the process variable. Second, by having the different limit relationships displayed independently, valuable screen real estate is used up making it impossible to show more than just a few process parameters at a time. This again forces a user to do serial comparisons across several variables. Third, none of the existing graphical approaches allow for direct manipulation of the variable limits. In other words, the user must change limits indicated by using a separate screen or separate textual information.

As indicated above, the displays used to convey information to a user for monitoring and manipulation of process variables, e.g., process variables of a controller providing control of a continuous multivariable production process, are not effective. For example, one particular problem involves the use of a great deal of textual information which requires the user to formulate relationships between different process variables of the controller (e.g., formulate relationships between current values and process limits, formulate relationships from the textual matter between trends of multiple process variables, etc.). Yet further, such conventional displays which attempt to provide adequate information for a user, e.g., trend plots, textual information, etc., require an undesirable amount of screen real estate.

SUMMARY OF THE INVENTION

The present invention provides for a graphical user interface which allows the user to exploit his or her perceptual strengths in detecting and resolving process abnormalities. Further, the interface helps users, e.g., engineers and operators, to acquire a better understanding of a controller and determine what actions they can take to assist the controller.

A graphical user interface for providing real-time process information to a user with regard to a process that is operable under control of one or more process variables according to the present invention includes a scale extending along a gauge axis, and one or more bars extending along the gauge axis. Each bar is representative of a set of high and low process limit values for a process variable. Further, the graphical user interface includes a graphical shape displayed along the gauge axis representative of a current value of the process variable.

In various embodiments of the graphical user interface, the one or more bars extending along the gauge axis may include a bar which is representative of a set of engineering hard high and low limits for the process variable, may include a bar representative of operator set high and low limits for the process variable, may include a bar extending along the gauge axis representative of operator set high and low limits for the process variable within a bar representative of the engineering hard high and low limits for the process variable, and/or may include a delta soft high region and a delta soft low region representative of a delta optimization range within a bar representative of the operator set high and low limits.

In other embodiments, the graphical user interface may include user manipulation elements movable to change one or more of the high and low process limit values (e.g., engineering hard limits or operator set soft limits), the scale of the interface may be automatically adjustable as a function of the movement of the user manipulation elements, the interface may include at least one additional graphical shape displayed along the gauge axis representative of one or more additional values (e.g., a predicted value) for the process variable, the scale of the interface extending along the gauge axis may be adjustable as a function of a current value of the process variable relative to process limit values, the graphical shape representative of the current value of the process variable may be color coded to provide the user with additional information, and/or the background of a region adjacent the one or more bars along the gauge axis may be color coded (e.g., representative of engineering physical limits of the process variable).

Yet further, the graphical user interface may include a trend graph for the process variable. The trend graph may include a historical trend graph and/or a prediction trend graph for displaying trend information representative of process variable values or process variable limits.

A computer implemented method for providing a graphical user interface for providing real-time process information to a user for a process that is operable under control of one or more process variables is also described. The method includes displaying a scale extending along a gauge axis and displaying one or more bars extending along the gauge axis. Each bar is representative of a set of high and low process limit values for a process variable. Data representative of at least the current value of the process variable is provided and a graphical shape is displayed along the gauge axis representative of the current value of the process variable relative to the set of high and low process limit values.

In one embodiment of the method, the one or more bars extending along the gauge axis may include a bar representative of engineering hard high and low limits for a process variable, may include a bar extending along the gauge axis representative of operator set high and low limits for a process variable, and/or may include a delta soft high region and a delta soft low region representative of a delta optimization range within the operator set high and low limits.

In other embodiments of the method, the method may further include displaying user manipulation elements movable to change one or more of the high and low process limit values, rescaling the scale extending along the gauge axis as a function of the movement of the user manipulation elements, displaying an additional graphical shape along the gauge axis representative of an additional value (e.g., predicted value) for the process variable, rescaling the scale extending along the gauge axis as a function of the current value of the process variable relative to the set of high and low process limit values, displaying the graphical shape in a color that reflects the state of the current value for the process variable, and/or displaying a graphical element representative of engineering physical limits of the process variable.

In further embodiments of the method, the method may further include displaying a trend graph for the process variable with the displayed scale, one or more bars, and the graphical shape representative of the current value of the process variable. The trend graph may include displaying a historical trend graph and/or a prediction trend graph for the process variable representative of process variable values and/or process variable limits.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIGS. 7A–7G are more detailed diagrams illustrating a process variable gauge interface for a process variable detail and change view display region such as shown in FIG. 6.

DETAILED DESCRIPTION OF THE EMBODIMENTS

Figure 1:
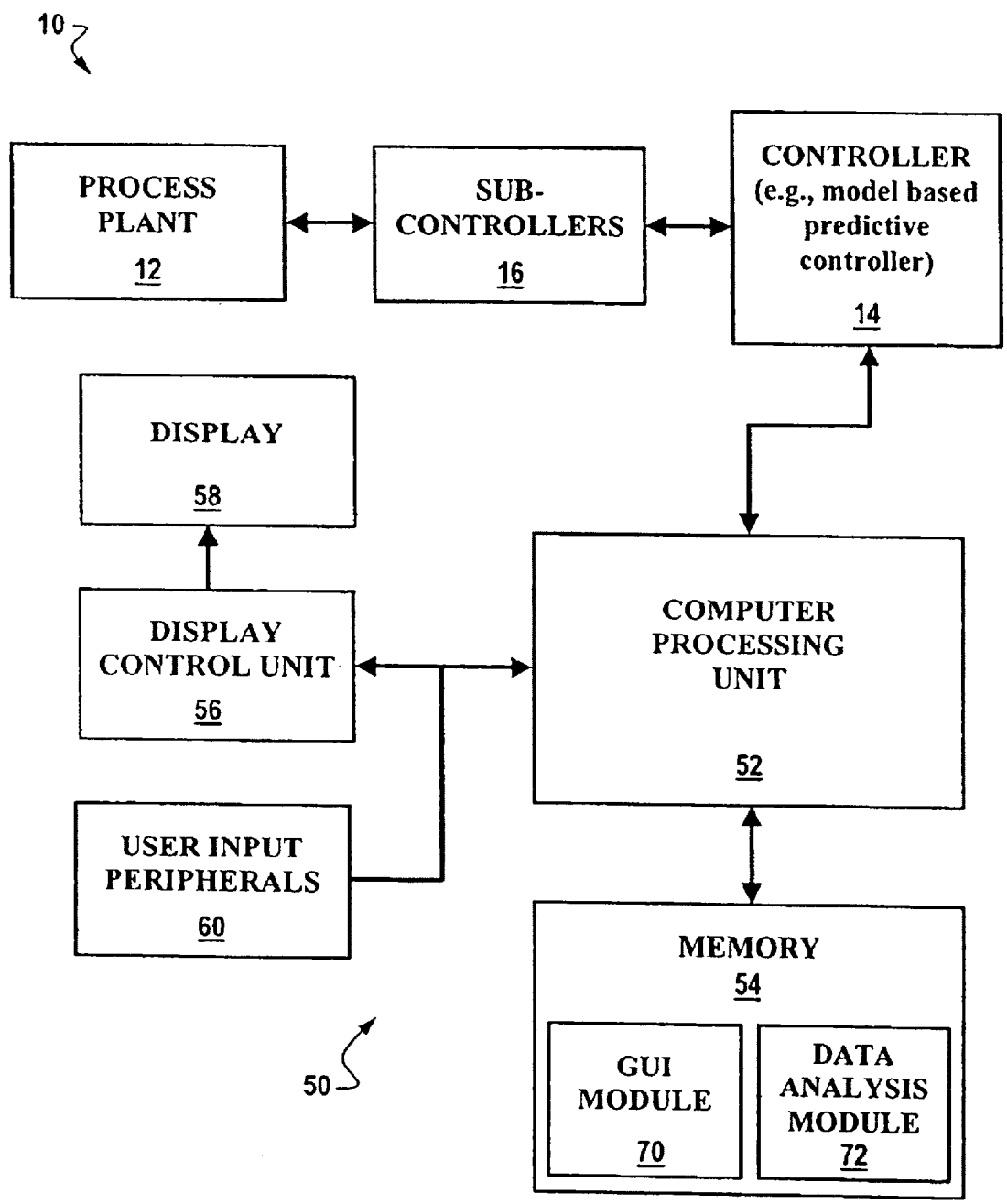
FIG. 1 is a block diagram of a process system including a graphical user interface according to the present invention.

FIG. 1 is a block diagram showing a process system 10 including a graphical user interface 50 to assist users in the monitoring and manipulation of one or more process variables contained in a controller 14 operable to control a process performed by a process plant 12. The process system 10 includes the process plant 12 for performing a process under control of controller 14 and one or more optional subcontrollers 16.

The process plant 12 is representative of one or more plant components for performing a plant process or portion of a plant process operable under control of one or more process variables of a controller 14. For example, the process plant 12 may be a petrochemical refinery for performing a petrochemical process, nuclear plant, chemical plant, etc. The present invention is not limited to any particular process plant 12 but is particularly advantageous in the control of continuous multivariable production processes.

The controller 14 and optional subcontrollers 16 may include any control apparatus containing one or more process variables for use in control of a process performed by the process plant 12. For example, various portions of the graphical user interface 50 as described herein may be applicable to a controller providing for control of a process via a single process variable. However, the controller 14 preferably is a constraint-based controller wherein limits are provided for the one or more process variables of the controller such that the controller operates to keep the one or more process variables within such limits during control of the process performed by the plant 12. Although the present invention may be beneficial for the effective monitoring and manipulation of process variables of a controller for any multivariable process, the graphical user interface 50 as described herein is particularly beneficial for monitoring and manipulation of process variables associated with a model-based predictive controller. For simplicity, the invention as further described herein shall be with regard to a model based predictive controller 14. However, one skilled in the art will recognize that the user interface techniques described herein are in no manner limited to multivariable processes or model based predictive controllers, but may find general application to various controllers and various processes including single process variable controllers and processes.

In general, as previously described in the Background of the Invention section herein, a model-based predictive controller 14 includes algorithms which compute control moves as a solution to an optimization problem for minimizing errors subject to constraints, either user imposed or system imposed. A model-based predictive controller is typically a multi-input, multi-output control application containing multiple variables for use in controlling a process. Generally, the model-based predictive control consists of two major portions: first, an optimization program is used to define the best place to run the process at steady state, and, second, a dynamic control algorithm defines how to move the process to the steady state optimum in a smooth way without violating any constraints. For example, at a specified frequency, e.g., every minute, the optimizer looks at the current state of the process and calculates a new optimum. From the optimizer, the controller knows where process variables should be in the final steady state. The control algorithm then calculates a dynamic set of changes for the process variables to move the process in a smooth way to the steady state with no dynamic violations of constraints. For example, 60–120 control moves may be calculated out into the future for a process variable.. Generally, one of the calculated control moves is implemented and the rest thrown away. These steps are then reiterated. The control objective for the model-based predictive control is generally to provide for optimum controlled variables (defined below) through calculation using a model based on economic values.

For example, model-based predictive control can be performed using products available from several companies. For example, as previously indicated in the Background of the Invention section, model based predictive control is performed by a Dynamic Matrix Control (DMC) product available from Aspen Tech (Cambridge, Mass.), and by a Robust Multivariable Predictive Control Technology (RMPCT) product available from Honeywell Inc. (Minneapolis, Minn.) which is a multi-input, multi-output control application product that controls and optimizes highly interactive industrial processes. Although several controllers are listed herein, the present invention is not limited to use with only these controllers. Such controllers are listed for illustrative purposes only, and the graphical user interface techniques described herein are applicable to all controllers where monitoring and/or manipulation of one or more process variables is desirable. Further, the description herein with regard to the model based predictive controller 14 is in very general terms as one skilled in the art is familiar with such controllers and the input and outputs therefrom.

Generally, a model-based predictive controller 14 contains three types of variables; namely, controlled variables (CVs), manipulated variables (MVs), and disturbance variables (DVs) (sometimes also referred to as feed forward variables (FFs)), although other controllers may contain other types of variables. As used herein, controlled variables are those variables that the controller is trying to keep within constraints. Further, it may also be desirable to minimize, maximize, or keep at a target value, some of the controlled variables (e.g., maximize a feed throughput process variable). Manipulated variables are those variables such as valves or "handles" that the controller can open and close to try to achieve an objective of the controller (e.g., maximizing feed throughput) while maintaining all of the other variables within their constraints. Disturbance variables are those variables that can be measured, but not controlled. Disturbance variables assist the controller by providing needed information such as information regarding certain factors, e.g., outside air temperature. The controller 14 can then recognize how such factors will effect other process variables in the controller, so as to better predict how the plant will react to changes in those factors. The subcontrollers 16 may consist of a subset of manipulated variables and controlled variables. However, typically such subcontrollers 16 attempt to control via feedback a manipulated variable to be within certain limits.

A user of the model-based predictive controller 14 (e.g., an engineer, an operator, etc.) is provided according to the present invention with various types of information regarding the various process variables including information concerning the controlled variables, manipulated variables, and disturbance variables of the controller 14 by the graphical user interface 50 as further described below. The user can monitor such information and interact with the controller 14 in various ways also as further described below. For example, the user may change various types of limits placed on process variables contained in the controller (e.g., change low or high limits for individual process variables).

The graphical user interface 50 provides a user (e.g., an engineer, an operator, etc.) the ability to monitor, understand, and adjust the controller 14 such that the user can effectively interact with the controller so as to, for example, allow the user to know if the controller will be able to handle a process disturbance. Further, the graphical user interface 50 provides the user the ability to monitor multiple process variables (e.g., feed rates, product rates, user-defined tags, etc.) to watch for things like oscillating variables when the process variable is being optimized, and monitor key process variables critical to the health of the controller, all on a single display screen. The graphical user interface 50 provides a user with tools such as the relationship between manipulated variables and controlled variables, a display of which process variables are constrained at limits, and a display of the relationships between process variables to aid in diagnosis of a particular problem in the controller 14.

For example, various situations may require the user to interact with the controller 14. For example, during maintenance of the process plant, various process variables may need to be taken out of control for calibrating instruments or other maintenance activities. There may be a need to determine how things have been running between a switch of operator shifts; there may be a directive from operations or engineering to change the model, constraints, targets, etc.; there may be a requirement for the operator to handle upsets either by assisting the controller or letting the controller handle the disturbance, or turning off the controller; or there may be various other diagnosis circumstances, such as the controller not being well-tuned, the controller taking temporary action to compensate for a disturbance; etc.

Generally, as shown in FIG. 1, the graphical user interface 50 receives data regarding the one or more process variables from controller 14. As previously indicated herein, the graphical user interface 50 may be useable with respect to a single process variable being controlled, or, more preferably, receives data associated with multiple process variables from controller 14.

The graphical user interface 50 includes, as shown in FIG. 1, a display 58 operable under control of display controller 56 and computer processing unit 52. Various user input peripherals 60 may be used for communicating information to the computer processing unit 52. For example, user input peripherals 60 may include write pens, a mouse, a keyboard, a touch sensitive display screen, or any other user input peripheral generally used for graphical user interfaces. The computer processing unit 52 interacts with a memory 54 for executing one or more programs stored therein. Memory 54, under control of computer process unit 52 provides for storage therein of various information, e.g., screen information, format information, data to be displayed, or any other information as will be apparent from the description herein with regard to the various screens displayed on display 58.

The computer processing unit 52 functions to adapt information received thereby. For example, information received from the model predictive controller 14 is adapted for delivery of display information to display control unit 56 for display on a screen display 58. Further, for example, information received via user input peripherals 60 is adapted for use, e.g., navigation, or delivery to the controller 14, e.g., limit changes for controller 14. Display operation and user input control functionality through user input peripherals 60 are generally known in the art. For example, textual information can be edited, process variables may be selected, highlighting may be implemented by clicking, elements may be dragged to input changes in information, etc.

Memory 54, as shown in FIG. 1, includes graphical user interface (GUI) module 70 including programming for use in providing the varied display screens as further described herein and editing such display screens as needed on a real-time basis as data is received from controller 14 by computer processing unit 52. For example, GUI module 70 provides for the transfer of current value data received from the controller directly to the appropriate object on the display screen. Further, memory 54 has stored therein data analysis module 72 including programming which assists in processing with respect to data received from controller 14 that is to be modified in its general nature prior to providing such data for updating the display screen. For example, data analysis module 72 is used for processing historical data to reduce such data to a particular trend shape element for display as further described below.

Preferably, display functions are performed using a standard monitor (preferably large enough to display all the display regions as described below) and the graphical elements displayed are implemented using Visual Basic code. Further, preferably, an NT system is used to perform the processing required. However, one skilled in the art will recognize that any suitable components and code capable of carrying out the techniques embodied in the graphical user interface display screens and allowing for interaction with the controller 14 may be used as contemplated according to the present invention.

Figure 2:
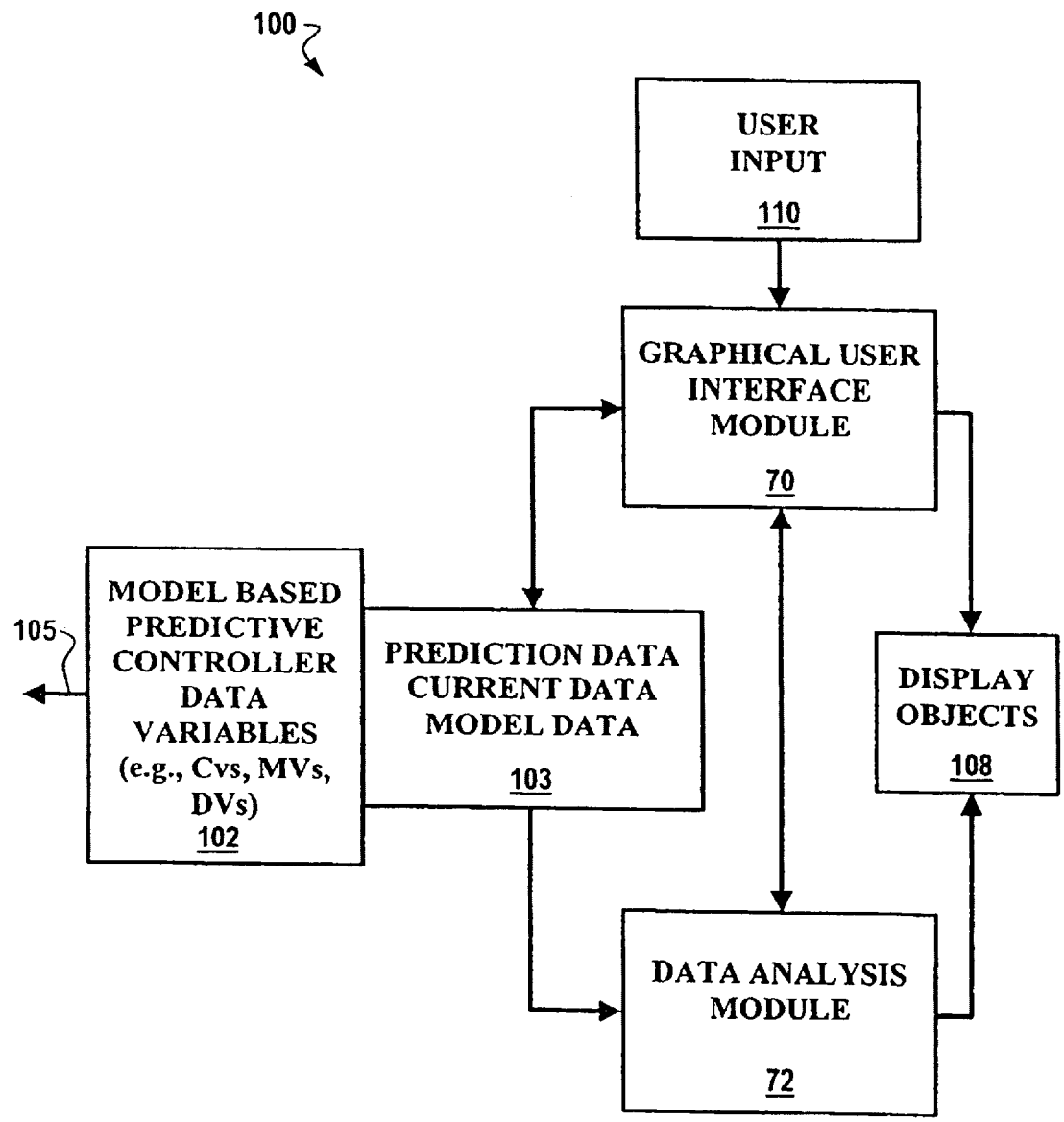
FIG. 2 is a data flow diagram of the graphical user interface shown in FIG. 1.

FIG. 2 shows an illustrative data flow diagram 100 for a model-based predictive controller 14 provided with a graphical user interface 50 according to the present invention. Model-based predictive controller data 102 includes process control commands 105 for controlling process plant 12 in a manner as conventionally known in the art. For example, model-based predictive controller 14 at a specified frequency, will calculate an optimum steady state which dictates where the values of certain process variables should be. Thereafter, the controller calculates a dynamic set of changes to the manipulated variables to move the processor in a smooth way to the steady state by providing the desired changes for the manipulated variables to apparatus for implementing such changes, e.g., subcontrollers 16, valves, other "handles", etc. In other words, the process control commands 105 are provided for control of the manipulated variables.

The model-based predictive controller 14 generates various values provided as data to the graphical user interface 50 related to the various process variables contained in the controller 14. The model-based predictive controller data 102 provided to the graphical user interface 50 includes at least prediction value data, current value data, and model data 103. For example, the prediction value data includes the data based on the future control moves calculated for the various process variables as described above. For example, as indicated above, the model-based predictive controller 14 may calculate 60–120 control moves out into the future with associated predicted values being generated for the process variables, particularly for the manipulated variables and controlled variables.

The current value data provided to the graphical user interface 50 includes currently measured values from any number of sources. For example, current values may be measured by any of the subcontrollers including sensors, valve positions, etc. Further, such data may be provided directly from a component of the process plant 12 or may be a value generated for a process variable, e.g., controlled variable, by the controller 14.

Model data includes static information such as that related to the controller 14 itself, e.g., gain relationships between a controlled variable versus a manipulated variable, delay values, coefficients of various model equations, etc. Generally, such data is fixed data and is in many circumstances provided to the graphical user interface once as opposed to the other types of data that change continuously.

The prediction value data, current value data, and model data is provided to the computer processing unit 52 and used by the graphical user interface module 70 and data analysis module 72 as required to display the screens as further described herein. For example, the graphical user interface module 70 receives current value data from the controller 14 and uses such current data to update display objects 108 for display. Further, for example, user input data 110 is provided to the graphical user interface module 70 via the computer processing unit 52 for communication back to the model-based predictive controller 14. For example, user input data may include changed limits for a particular process variable which are provided to the controller 14 for use in further control and optimization calculations.

Data analysis module 72 operates on data provided from the controller 14 to provide data for displaying objects 108. For example, data analysis module 72 may receive and store current data over a time period so as to characterize trends in such historical stored data for one or more process variables. Such trends may then be displayed as further described herein using graphical trend shape elements resembling generalized plots of such data. Further, data analysis module 72 may perform comparisons between current value data and set limits so as to display appropriate color information as a way of alerting a user to particular information on display in the graphical user interface 50. The data analysis module, after completing processing of data received thereby, may provide data for direct manipulation of display objects 108 or provide information to graphical user interface module 70 with the graphical user interface module 70 providing for any desirable manipulation of display objects 108.

Figure 3:
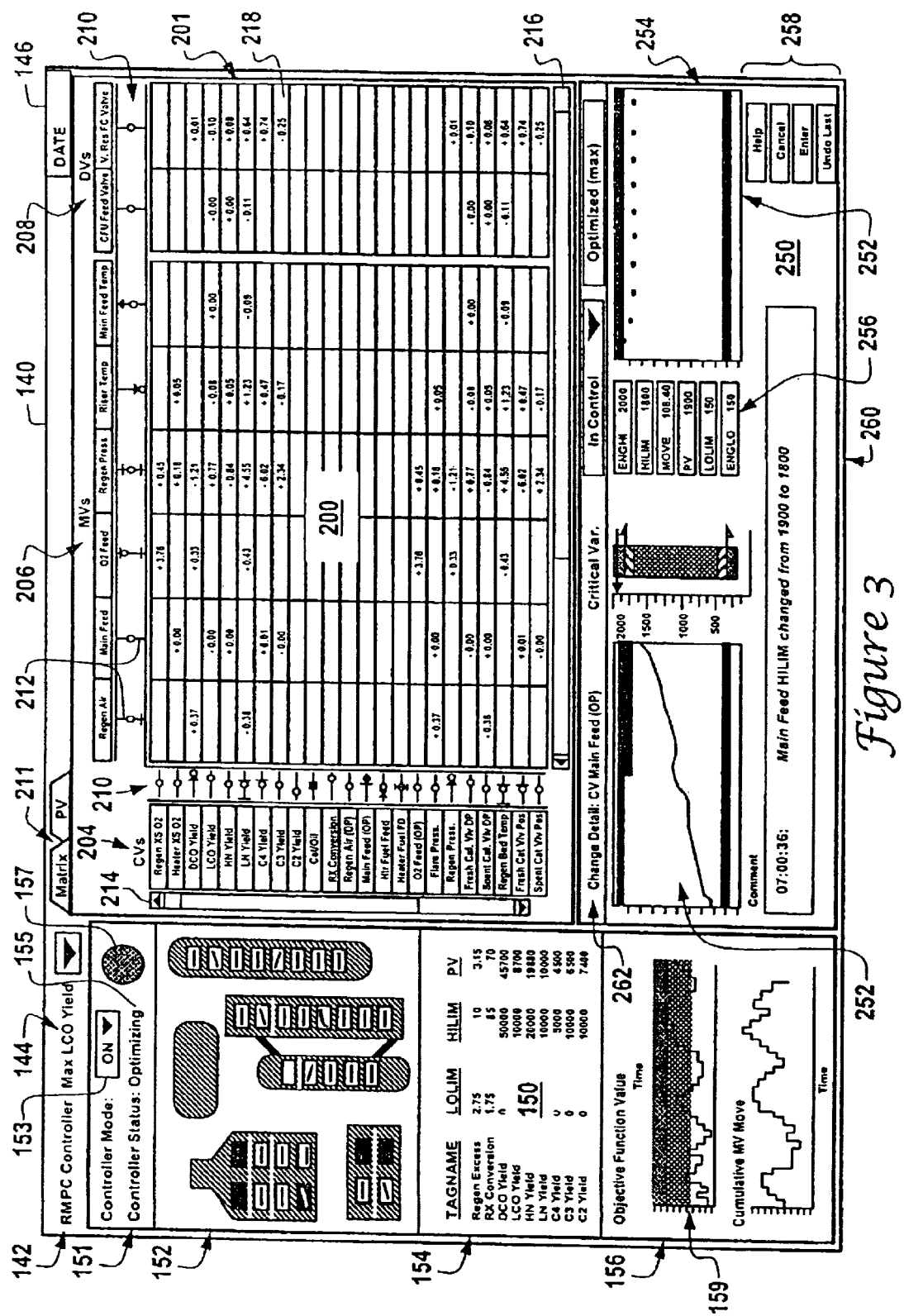
FIG. 3 is a screen display generally showing the components of the graphical user interface of FIG. 1.

FIG. 3 is a general diagram showing an illustrative display screen for the graphical user interface 50. Generally, the viewable field of the display screen is divided into three functional areas including multivariable process overview display region 150, multivariable process matrix display region 200, and process variable detail and change view display interface region 250.

Figure 4:
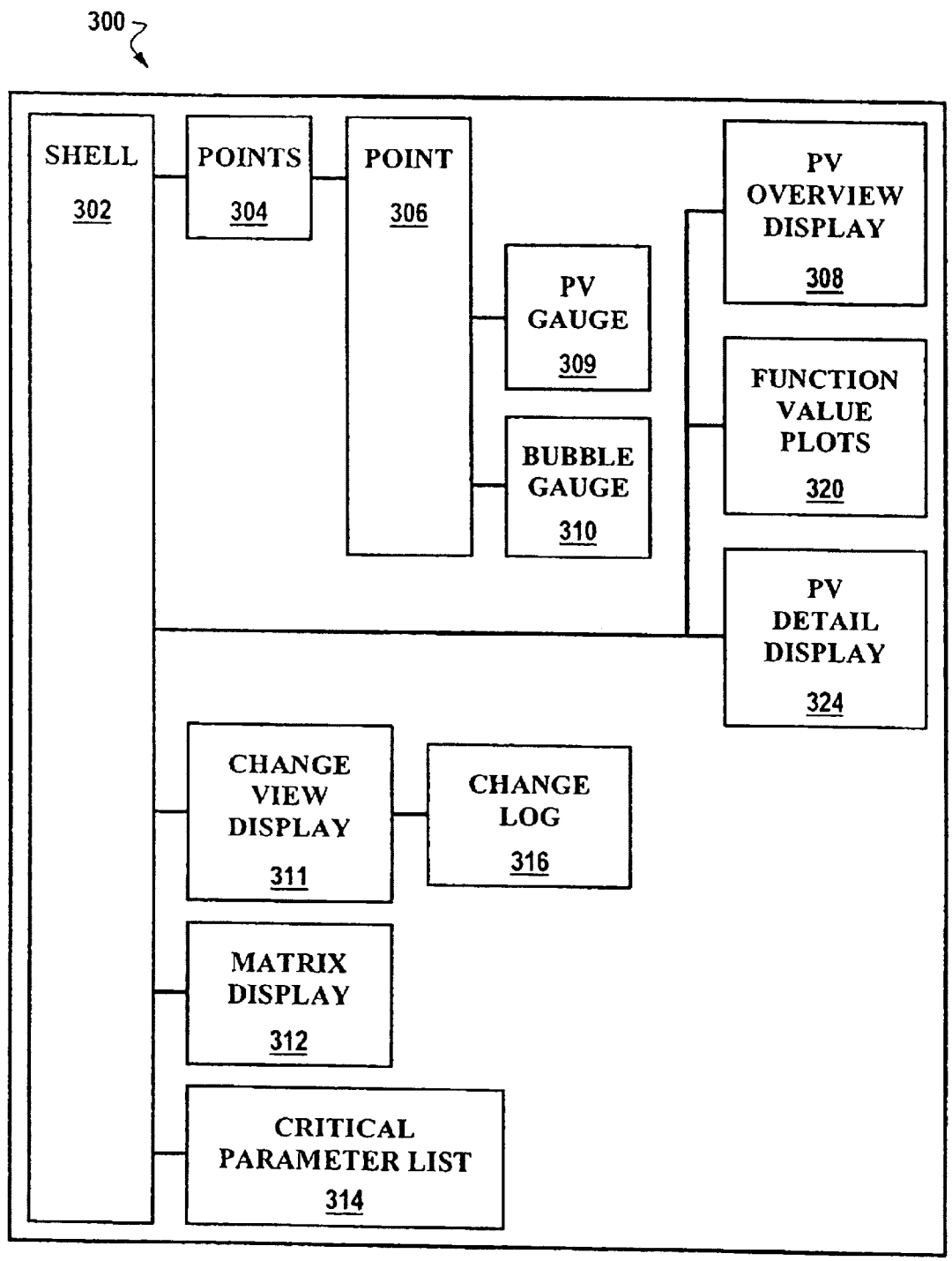
FIG. 4 is an object model overview of the graphical user interface of FIG. 1.

FIG. 4 is an object model overview 300 for the display screen shown in FIG. 3. Generally, the principle data object is a Point 306 of a plurality of Points 304 which may be manipulated variable-type, controlled variable-tape, or disturbance variable-type Points. The Point has many attributes and methods associated therewith. Each Point has the responsibility of displaying itself in the appropriate display object(s). Each Point is updated as appropriate as data changes and updates display objects as necessary.

Shell object 302 is the container for the graphical user interface application and includes all items/objects not shown separately on the object model overview, e.g., the iteration time clock 157, general controller information 151, tabs for containers for visual objects such as in tabs region 211, date 146, etc. The shell object 302 corresponds to display shell 140 as shown in FIG. 3.

The object connectivity and control of the other items/objects shown separately on the object model overview shall be summarily described by describing a couple of the objects. For example, the process variable overview display object 308 which corresponds to trend overview display 152 may be a frame container housing for graphics. Such containers can be for a set of images representing state information of Point objects. An image list control is part of this object 308 and contains all possible images for the icons which are described in further detail below. During system configuration, the positions of the possible icon images are assigned to the Point objects. At the time of data update, the Point objects will request the display object 308 to display the icons appropriate to the state of the Points as determined by the evaluation of state estimator algorithms, e.g., historical data to trend behavior reduction algorithms, as described further below.

Further, for example, the process variable gauge object 308 corresponding to process variable gauge interface 256 is owned by a Point object which changes the display. The user may make changes to the Point object attributes via this interface, e.g., limits, and the change may be by use of a textual table or by dragging a graphical element, e.g., a limit flag dragged using a mouse. In a like manner, each Point has the responsibility of displaying itself as the appropriate process variable gauge object 308.

It will be recognized that each of the objects in FIG. 4 correspond to an object displayed in FIG. 3. For example, bubble gauge object 310 corresponds to a summary graphical device 212, change view display object 311 corresponds to display interface region 250, change log object 316 corresponds to log 260, matrix display object 312 corresponds to matrix display 201, critical parameter list object 314 corresponds to critical parameter list 154, function value plot object 320 corresponds to function plot 159, and process variable detail display object 324 corresponds to PV detail display selectable using tab "PV Detail" in tab region 211.

The multivariable process overview display region 150 is generally segmented into four functional areas to orient users to recent changes and potential problems. This overview display region 150 provides particular support for shift changes, e.g., change of operators between shifts, and periodic monitoring of the controller 14. Generally, the four functional areas of the overview display region 150 include controller information 151, multivariable process trend display 152, critical parameter list 154, and trend plot region 156. Each of these four functional regions are described below with the multivariable process trend display 152 described in particular detail with reference to FIGS. 5A–5B.

The controller information 151 appears at the top of the overview display region 150 in the form of a number of text fields and pull-down menus. First, in the upper, left-hand corner of the region, there is a text field 142 with the name of the active controller model. Next to the text field 142 with the name of the active controller model is a text display 144 showing the name of the particular displayed controller. If there is more than one controller available, a pull-down menu button may be used to allow the user to select from a list of other names. Below these items are controller modes 153 and status indication 155. For example, the status indications may include indications such as optimizing, handling constraints, etc. The user can select, such as with use of a pull-down menu, a controller mode 153 such as on, off, warm, etc. The mode may change as a function of the controller condition. Finally, a clock 157 marks the seconds since the beginning of the last controller execution.

The critical parameter list 154 provides user-specified information about a set of site-specific parameters. These parameters could be a predefined set of critical process variables, or a dynamic list, such as process variables near or outside their limits, or process variables that meet other criteria. The critical parameter information provides detailed information about a small set of variables that meet some criteria for criticality. For example, such a critical parameter list 154 may be user-defined such that any particular characteristics available can be updated regularly.

The trend region 156 may include any number of trend plots representative of some overall functionality of the system. For example, as shown in trend region 156, an objective function value plot 159 gives a user some insight into how well the controller is optimizing the process. Further, for example, an energy plot, designed to provide the user with a sense of how hard the controller is working to adjust the manipulated variables, may be shown. As shown by the objective function value plot 159, various shades of color may be used to indicate boundaries to provide the user with further information such as when the plot values should alert the user that the controller is not functioning effectively.

Figure 5A:
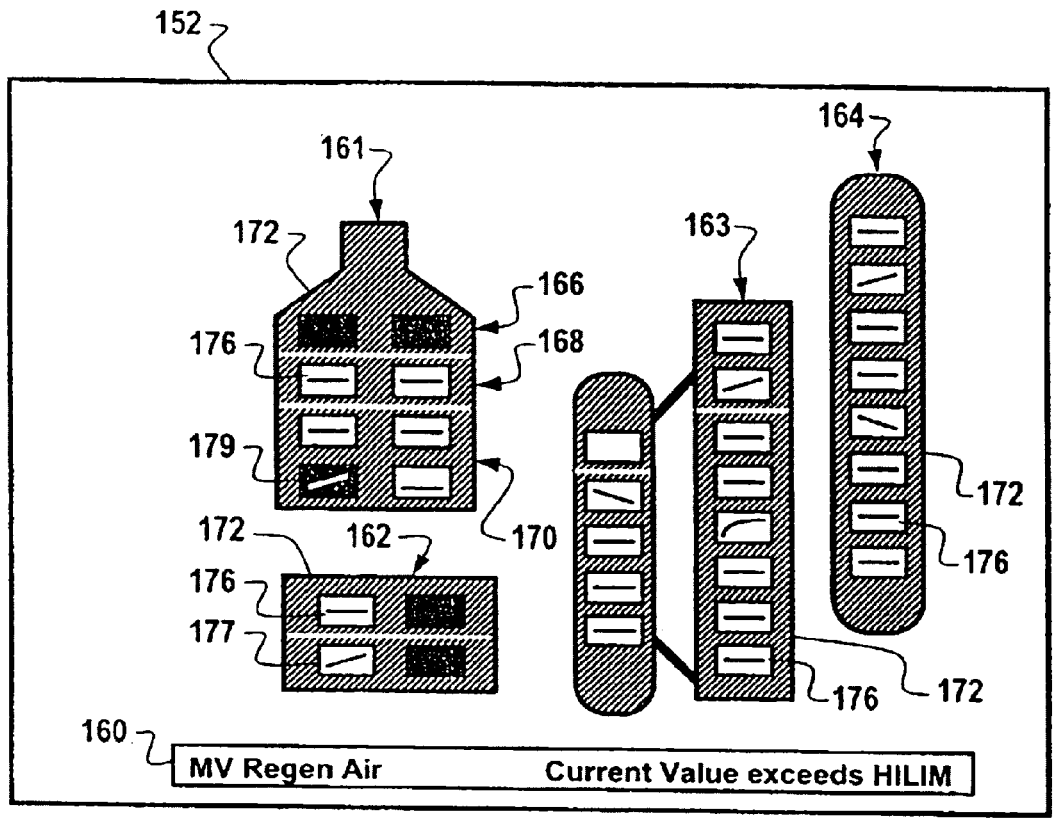
FIGS. 5A and 5B are more detailed diagrams of a process variable overview display region such as that generally shown in FIG. 3.
Figure 5B:
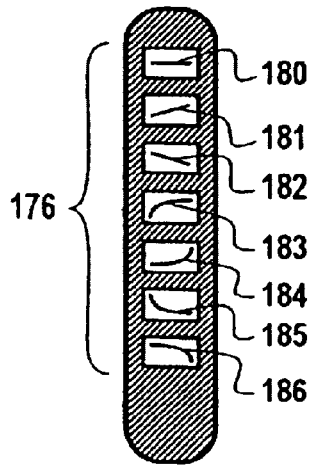

The multivariable process overview trend display 152 is shown in more detail in FIGS. 5A and 5B. The trend display 152 encodes historical trends for process variables to trend shape elements. Each trend shape element is representative of a trend behavior. Preferably, each of the trend shape elements is representative of one of a predetermined set of process trend behaviors. However, such trend shape elements may show dynamic trends, e.g., plots of actual data points such as selected or sampled data points. As used herein, historical refers to any time period prior to a current reference time.

The process trend behaviors preferably, as described in an illustrative set of trend elements below, include behaviors indicative of the rate of change of the process variable (i.e., velocity (first derivative)) and the rate of change of the velocity (i.e., acceleration (second derivative)). The purpose of the multivariable process trend display 152 is to provide the user with a high level overview of the state of the process and the controller. The trend display 152 relies on the human user's ability to detect abnormalities in visual patterns.

The trend display 152 is a graphical display for the results of a signal trend analysis algorithm of the data analysis module 72 performed on data from the controller 14. This type of mass data display provides an easily perceived indication of the status of many process variables upon which the algorithm is executed. The algorithm is capable of visually coding other types of information (e.g., deviation from predicted values, selection of a variable, and unanticipated state change) and supports navigation for the graphical user interface 50.

The multivariable process overview trend display 152 includes a field of overview plant component icons having embedded therein trend shape elements 176. The trend shape elements 176 may, for example, be part of a field of a bit map, e.g., a 16×16 pixel bit map, referred to herein as a process variable trend icon 172. The plant component icons 161–164 preferably are shaped to correspond to a plant component of the process plant 12. Further, preferably, such plant component icons 161–164 are arranged on the trend display 152 according to their functional location in the continuous multivariable process being controlled.

Embedded in the frame defined by the plant component icons 161–164 are the process variable trend icons 172; each including a trend shape element 176. The plant component icons 161–164 have embedded therein a process variable trend icon 172 for each process variable associated with that particular plant component of the process plant. For example, as shown in FIG. 5A, plant component icon 161 includes two manipulated variables 166, two disturbance variables 168, and four controlled variables 170 which are associated with a particular plant component 161. Plant component icon 162 includes two process variable trend icons 172, plant component icon 163 includes thirteen process variable trend icons 172, and plant component icon 164 includes eight process variable trend icons 172. Preferably, the trend shape elements are positioned in close proximity to one another so as to permit patterns of changes between such positioned trend shape elements 176 to be perceived by a user.

The process variable trend icon 172 conveys several types of information. First, the signal trend analysis algorithm which is part of the data analysis module 72 of graphical user interface 50 provides for the reduction of the trend behavior of a process variable to primitive trend elements representative of behavior types. For example, as shown in FIG. 5B, one set of trend shape elements 176 is shown. The set of trend shape elements 176 include seven graphical elements 180–186; each representative of a different trend behavior. For illustration, the seven graphic elements 180–186 represent the following trend behaviors indicative of the rate of change (i.e., velocity) of process variable values and also rate of change of velocity (i.e., acceleration) for the process variable values. Trend shape element 180 represents a steady state behavior, trend shape element 181 represents a ramping up behavior, trend shape element 182 represents a ramping down behavior, trend shape element 183 represents an increasing at a decreasing rate behavior, trend shape element 184 represents an increasing at an increasing rate behavior, trend shape element 185 represents a decreasing at a decreasing rate behavior, and trend shape element 186 represents a decreasing at an increasing rate behavior.

The signal trend analysis algorithm reduces historical data received from the model-based predictive controller 14 to one of the trend shape elements 180–186 of the set of trend shape elements 176. The algorithm, after comparing and determining which trend behavior better represents the historical data for the process variable being analyzed, provides for the display of the appropriate trend shape element 180–186 corresponding to the determined trend behavior. Preferably, each process variable is reduced to a trend behavior in this manner and a corresponding trend shape element is displayed for the process variable.

Generally and preferably, the trend shape elements 176 are each one dimensional shapes. The one dimensional shapes preferably resemble a generic plot of the particular trend behavior to which it corresponds, e.g., a horizontal straight line for a steady state behavior.

One skilled in the art will recognize from the description herein that any algorithm capable of reducing historical data for a process variable to one of a set of trend behaviors can be used according to the present invention. Further, various types of trend element shapes may be used to represent the various types of trend behaviors. Various references describe algorithms suitable for trend analysis, including: Xia, Betty Bin. "Similarity Search in Time Series Data Sets," M. S. Thesis, Simon Fraser University (1997); Bakshi, B. R. and Stephanopoulos, G. "Representation of Process Trends-III. Multiscale Extraction of Trends from Process Data", *Computers & Chemical Engineering*, Volume 18, pp. 267–302 (1994); Janusz M., and Venkatasubramanian, V., "Automatic Generation of qualitative description of process trends for fault detection and diagnosis," *Engng Applic. Artif. Intell.* 4, 329–339 (1991); Rengaswamy R. and Venkatasubramanian, V., "A syntactic pattern-recognition approach for process monitoring and fault diagnosis," *Engng. Applic. Artif. Intell*, 8, 35—51 (1995); and Cheung, J. T.-Y. and Stephanopoulos, G., "Representation of process trends. I. A formal representation framework," *Computers & Chemical Engineering*, Vol. 14, No. 4–5, pp. 495–510 (May 1990). Any algorithm which reduces historical data, preferably recent historical data, to trend behaviors displayable by a trend primitive element, e.g., generalized plots represented by simple line elements, may be used according to the present invention.

Color coding may also be used to define other characteristics of the process variable. For example, the trend shape element 176 displayed in the process variable overview icon 172 may be color coded to reflect the relationship between a current value of the process variable and user defined limits for the process variable. For example, the trend shape element 176 in plant overview icon 162 may be colored black to denote that the current value for the process variable is within the user defined limits, may be colored yellow to denote that the current value of the process variable is within a certain percentage of the user defined limits, or may be colored red to denote that the current value for the process variable is outside of user defined limits by at least a certain percentage. Such limits shall be described further below with respect to other portions of the graphical user interface 50.

Further, color coding can be used for the background 177 of a process variable trend icon 172 as shown in plant component icon 162. For example, colors of a set of colors can be keyed into any algorithm, alarm, or sensor that suits a particular application. For example, if an alarm situation is apparent for the process variable, the background 177 of the trend icon may be a green color.

Each of the process variable trend icons 172 is linked to a corresponding process variable for which the trend analysis algorithm is executed. The process variable trend icons 172 are embedded in associated static plant component icons 161–164 or bit maps that reflect the plant component to which the process variable applies, e.g., two process variables apply to plant component 162. The plant component icons 161–164 group the process variable trend icons 172 both visually and conceptually to help the user put into perspective where a problem for the controller 14 might be located. Such grouping of trend icons 172 is further enhanced by grouping of the trend icons 172 into groups of process variable types (e.g., manipulated variables, control variables, and disturbance variables). For example, as shown in FIG. 5A, with reference to plant component icon 161, manipulated variables 166 are grouped at the upper region of the plant component icon 161, disturbance variables 168 are grouped below the manipulated variables 166, and controlled variables 170 are grouped at the lower region of the plant component icon 161. The grouping of variables by type are separated by thin lines to distinguish the groups.

The process variable trend icons 172 need not be embedded in plant component icons 161–164 to be effective. For example, such trend icons 172 may be arranged in a row and column format, may be positioned with text indicating the name of the process variable, or can be configured in any other manner that may be beneficial in assisting the user to discern pertinent information therefrom.

Further, trend shape elements 176 representative of the behavior of the process variable may be displayed alone or as part of a bit map like that of trend icon 172 which provides a background for the trend shape element. One skilled in the art will recognize that more than one trend shape element may be used in a trend icon 172 to represent the behavior trend. For example, a trend shape element having a 45° angle extending upward in the trend icon 172 along with a symbol representative of a decreasing rate, e.g., a D, may be used to represent a particular rate at which the process variable is ramping up. Likewise, any number of combinations of primitive trend shapes may be used to represent behavior trends for the process variable. The present invention is not limited to any particular set of trend shape elements nor set of behavior trends represented thereby. Likewise, elements representative of limits for the process variable may be displayed in the trend icon, e.g., such as a line at the top of the icon 172 for a high limit. For example, the display of a limit line could be used to show that the current value for the process variable is getting close to a user defined high limit value.

Further, the multivariable process overview trend display 152 includes a status bar 160 to help users glean additional information about the trend icons 172. For example, when a mouse is passed over an overview trend icon 172, a description of the process variable corresponding to the trend icon is displayed along with a short description of additional information, such as a concern flag or a near limit textual alert, or any other textual matter desired. The status bar 160 provides a way for the user to obtain some information without navigating to additional screens when the user sees an unusual condition such as a decreasing at a decreasing rate trend shape element 185. The status bar 160 may act to confirm a user's expectation of an abnormal signal or to direct the problem solving activity that should follow.

The multivariable process overview trend display 152 further provides for navigation to more detailed information. For example, each of the trend icons 172 is linked to a particular row or column of the multivariable process matrix display 201 as will be further described below with reference to FIGS. 9 and 10. Further, each of the trend icons 172 or just the trend shape element may be linked to the process variable detail and change view display interface region 250. When a user selects one of the trend icons 172, a corresponding row/column of a matrix display 201 is highlighted and, further, more detailed information with regard to the process variable corresponding to the selected trend icon 172 is shown in the process variable detail and change view display interface region 250.

One skilled in the art will recognize from the description herein that the multivariable process overview trend display 152 helps users monitor the performance of a multivariable process. For a stable process, the trend icons 172 will appear flat and nondescript. As process variables in the process deviate from stable states and begin to transition to other states, the trend icons 172 become distorted by sloped and curved lines as represented by the preferred trend shape elements 176 of FIG. 5B. This distortion is easily recognized and calls the user's attention to the process variables in transition and alerts them to such changes. In the context of the complete process interface, the individual trend icons 172 can be linked to more detailed information about the process variable in transition as described above, such as by selection through clicking with a mouse, or selection using a keyboard.

Further, one skilled in the art will recognize that the more detailed information shown in process variable detail and change view display interface region 250 for a selected overview trend icon 172 is particularly advantageous in that both display region 150 and display interface region 250 are displayed on a single screen. As such, navigation is made extremely easy for the user and the user has more than one type of information on the same screen to evaluate.

Figure 6:
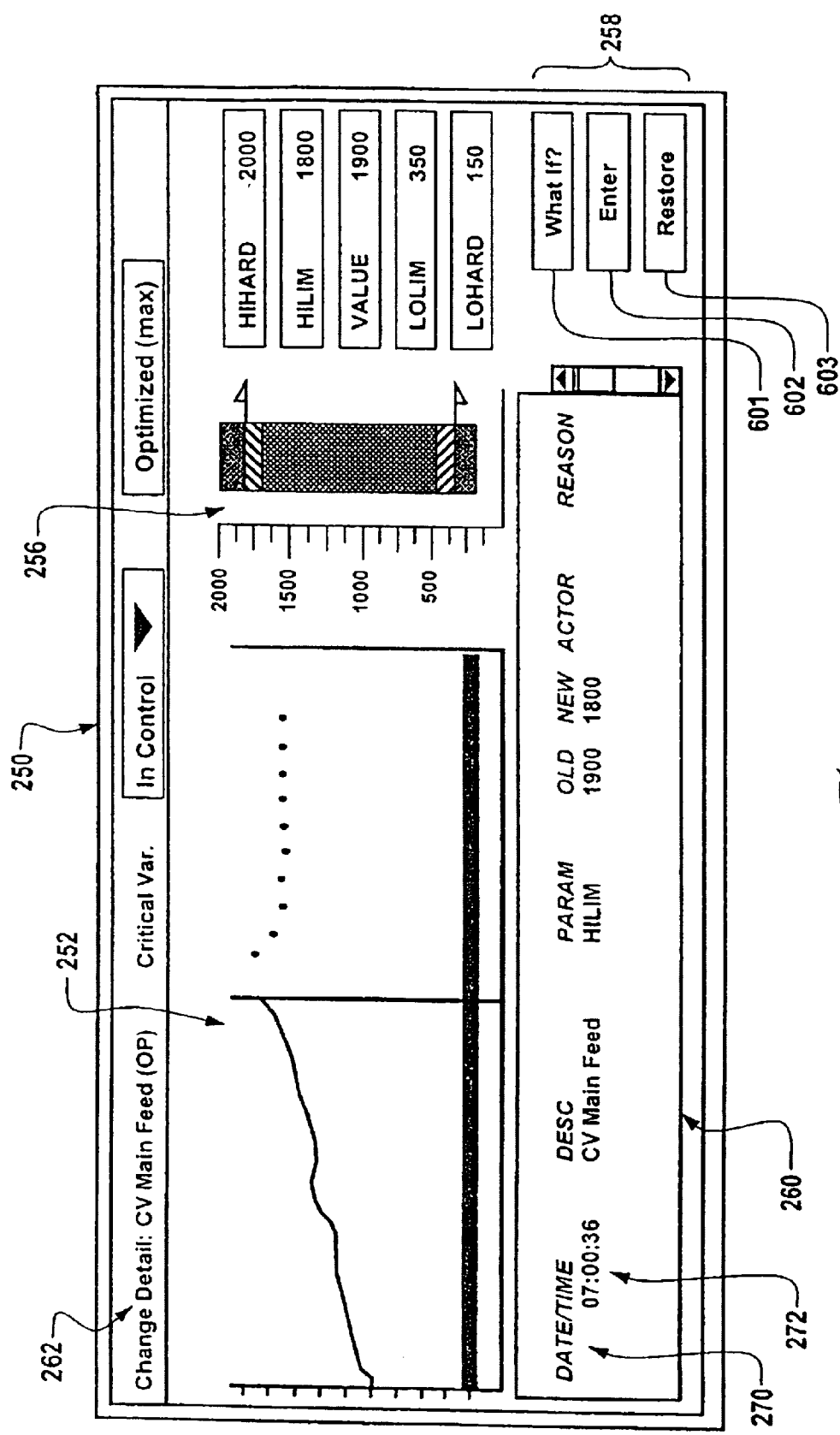
FIG. 6 is a more detailed diagram showing a process variable detail and change view display region such as that generally shown in FIG. 3.

Process variable detail and change view display interface region 250 is further shown in detail in FIG. 6. The process variable detail and change view display interface region 250 allows the user to manipulate control limits of a process variable and view both a visual and written history of a process variable's limit ranges and current values. The display interface region 250 attempts to assist the user in making accurate, well-informed limit changes in a meaningful context.

The process variable detail and change view display interface region 250 includes a trend history/prediction plot 252, process variable gauge interface 256, and button interface 258. One skilled in the art will recognize that FIG. 6 is slightly modified from display region 250 as shown in FIG. 3. However, generally, just portions of the display screen are rearranged and different names are provided for different buttons with regard to button interface 258.

Generally, the process variable gauge interface 256 of the display interface region 250 allows the user to view and manipulate current limits in the context of the current value of the process variable as further described below. The button interface 258 allows the user to view predictions and the impact a small change in a limit will have, instruct the controller to carry out those changes, and restore the limits to values used in a previous control interval. For example, the "What If" button 601 initiates the controller to run an iteration such that predictions can be generated and viewed in display region 260 with regard to a changed limit made by the user as further described below. The "Enter" button 602 will then instruct the controller to carry out those limit changes if the user so desires. Further, the "Restore" button 603, if selected, restores the limits to the values used in the previous control interval when the user does not desire to carry out limit changes.

Figure 8:
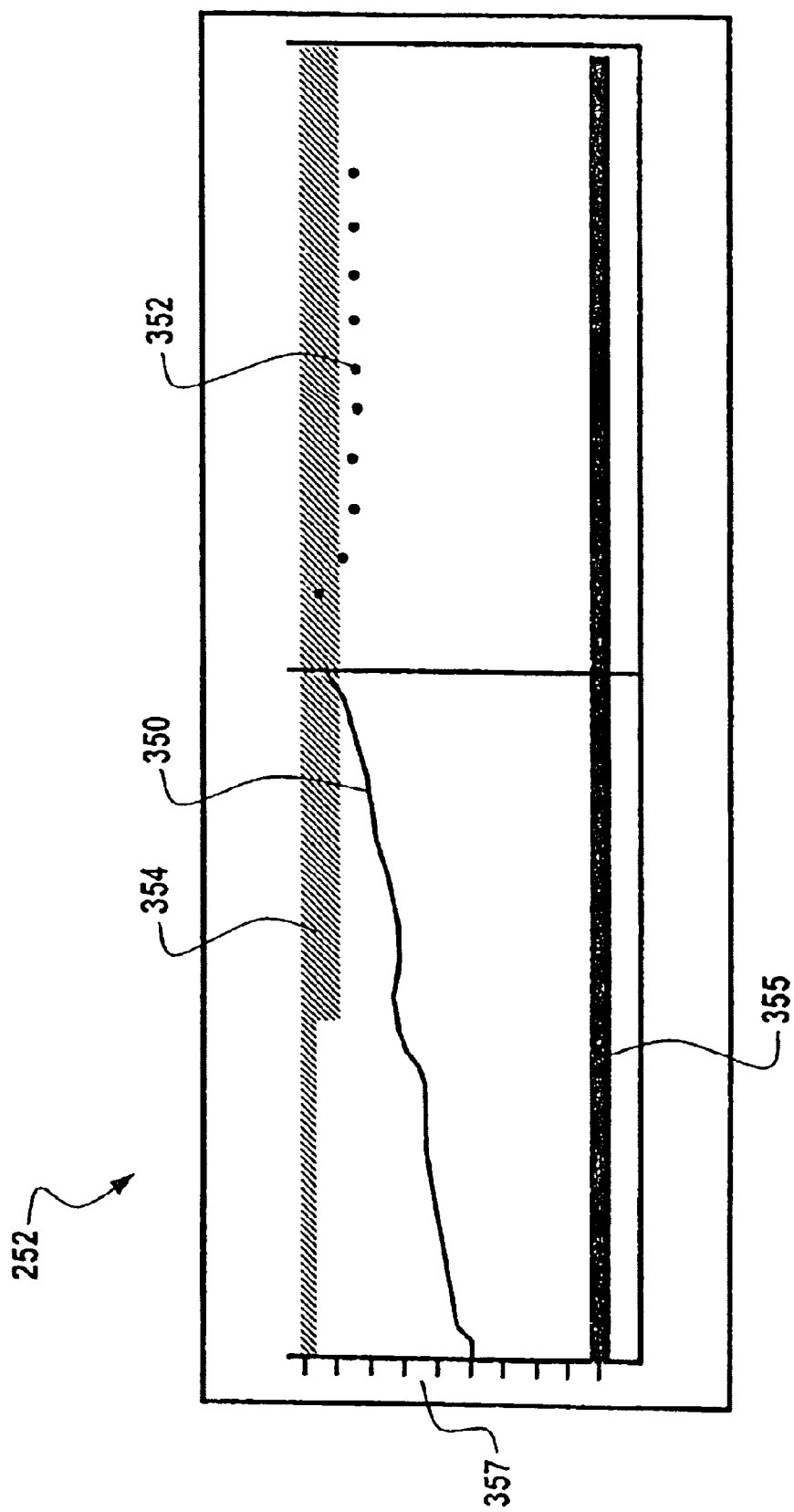
FIG. 8 is a diagram illustrating a trend interface like the interface generally shown in the process variable detail and change view display region of FIG. 3.

The trend history/prediction plot 252 provides extended trending capability and flexibility time scale manipulations. A more detailed diagram of the trend history/prediction plot 252 is shown in FIG. 8. In addition to a trace 350 of historical values of a particular process variable, this plot 252 also displays a prediction trend trace 352 of anticipated behavior for the process variable. Further, time scale (e.g., a shorter or longer period of time) and/or time frame (e.g., earlier or later time period) reflected in the trend history plot 350 and prediction plot 352 may be adjusted.

The vertical scale 357 of the trend history/prediction plot 252 matches the scale specified by the process variable gauge interface 256 as further described below. In other words, engineering hard high and low limits are equivalent for the plot 252 and the process variable gauge interface 256. Such equivalence makes it easy to compare the trend to the process variable gauge interface 256. Two bars, one bar on the top 354 and one bar on the bottom 355, depict the history of limits set for the process variable. For example, the lower bar 355 reflects the Δ between the operator set low limit and the engineering hard low limit settings, and the upper bar 354 shows the Δ between the operator set high limit and the engineering hard high limit settings. As seen in FIG. 8, the lower bar 355 reflects that the Δ stays the same across the time window whereas the upper bar 354 becomes thicker showing an increased Δ. The color of the constraint history bar may change as a function of the near limit status of the current value of the process variable to user defined limits. For example, if the current value of the process variable is between the operator set high and low limit values, then the constraint history bar is of a particular color, e.g., gray. If the current value is near the operator hard high or low limit values, then the bar turns another color, e.g., yellow. Further, for example, if the current value of the process variable exceeds one of the operator set high or low limits by more than 1%, then the bar turns yet another color, e.g., red.

Further included in the process variable detail and change view display interface region 250 is a change log 260, as shown in FIG. 6. The change log 260 automatically documents critical information about limit changes and encourages users to give explanations for them. When the user "Enters" a limit change via the button interface 258, a log entry with fields specifying the process variable and various parameters, such as old and new values, a date and time stamp 270, 272, and the actor, are provided.

The process variable gauge interface 256 is shown in further detail and described with reference to various embodiments thereof in FIG. 7A–7B. The various process limits which may be implemented using the graphical user interface 50 as described herein may include any number of sets of limits, and the present invention is not particularly limited to any particular type of set or any number of sets. However, preferably, four types of limits are employed in the process variable gauge interface 256 as shall be described with reference to FIGS. 7A–7G. A definition of each of the four limits shall first be provided herein so as to lend to the understanding of the process variable gauge interface 256.

As used herein, engineering physical limit values refer to limit values that define the physical limits of a piece of equipment or instrumentation. They represent the widest possible range of meaningful quantification of a process variable. For example, there may be engineering physical limits to measurements that a sensor may be able to provide.

As used herein, engineering hard limit values are those limit values set by a user, particularly a control engineer, to establish a range over which an operator or another user can safely set operator set limit values.

As used herein, operator set limit values are limit values through which operators exert influence on the controller 14. Such limits establish the range in which the control solution is free to act when it is afforded sufficient degrees of freedom.

Lastly, as used herein, optimization soft limits, or otherwise referred to herein as delta soft bands, are pseudo limits describing an offset within the operator set limits that the optimization calculations will attempt to respect.

The process variable gauge interface 256 includes a process variable gauge 280 which includes a gauge axis 285 (not generally displayed on the screen) and a scale 282 extending along and parallel with the gauge axis 285. One or more bars 284 extend along the gauge axis 285. Each bar is representative of a set of high and low process limit values for a particular process variable. Further, a graphical shape such as a pointer 297 is displayed along the gauge axis 285 representative of the current value of the process variable. Although the graphical bar elements 284 extending along the gauge axis 285 may represent any number of different types of limits relative to the specific process variable, preferably, the graphical bar element or elements 284 represent one of engineering hard limit values and operator set limit values. Optionally, one or more additional graphical shapes, e.g., pointer 298, may be positioned along the scale 282 indicating one or more predicted values for the process variable. For example, the predicted value may be a future value or may be a steady state predicted value. Further, the additional graphical shape(s) could be used to indicate historical values, e.g., a mean value, extreme values, etc.

Figure 7A:
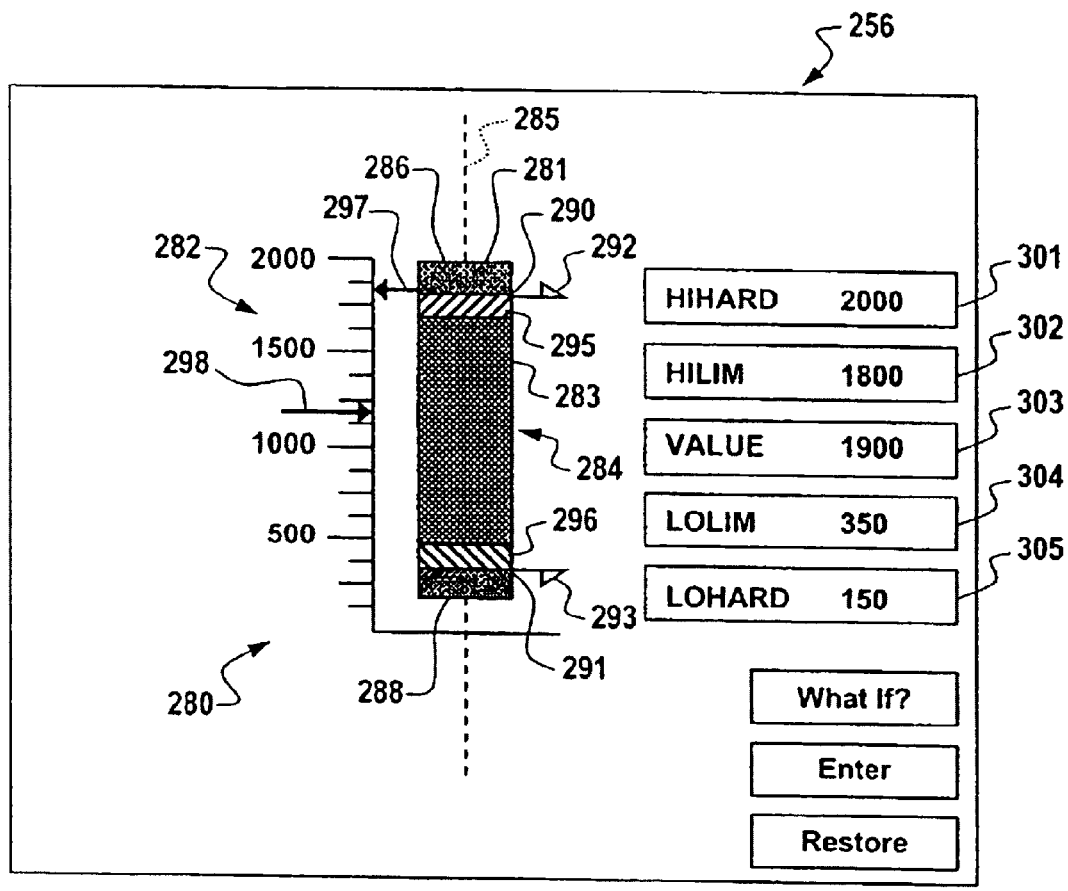
Figure 7B:
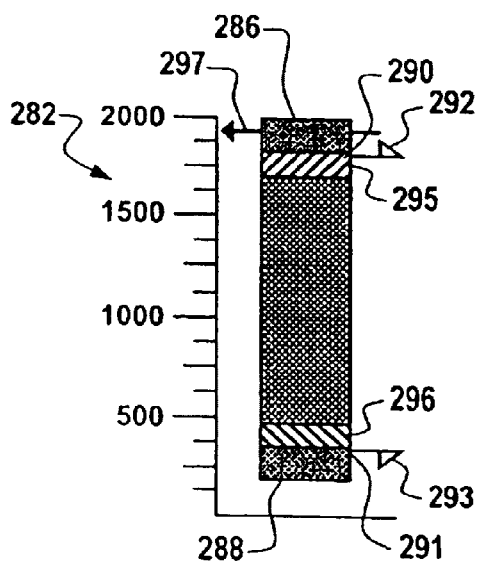

As shown in FIG. 7A, the one or more graphical bars 284 include a first bar 281 extending along the gauge axis 285. A first upper end 286 of the first bar 281 is representative of an engineering hard high limit, and a second end 288 is representative of an engineering hard low limit. Further, preferably, the one or more graphical bar elements 284 include a second bar 283, preferably displayed inside the first bar 281. The second bar 283 is representative of operator set limits. A first end 290 of the second bar 283 is representative of an operator set high limit and a second end 291 of the second bar 283 is representative of an operator set low limit. It will be noted that the limits are also shown in textual form beside the gauge. For example, the engineering high hard limit value is shown in textual field 301, the operator set high limit value is shown in textual field 302, the operator set low limit value is shown in textual field 304, and the engineering hard low limit is shown in textual field 305. The current value of the process variable is shown in textual field 303.

The hashed regions adjacent the first and second ends 290, 291 of the second bar 283 representative of the operator set high and low limit values, respectively, are the optimization soft limits. These limits define the delta soft high band 295 and delta soft low band 296. The hashed marks are designed such that when the delta soft high limit and delta soft low limit overlap (e.g., such as when the delta soft high and low limits are large in comparison to the region as defined by the operator set high and low limits), the diagonal hash marks will converge at a point, e.g., line on the graph (see FIG. 7C), relative to the respective proportion of the delta soft high and low limits. This emergent feature of the graphical display accurately represents a pseudo set point, i.e., the target optimization value that will be used by the optimization algorithm when the delta soft bands overlap. The controller 14 will attempt to control the process variable to the pseudo set point if at all possible.

The process variable gauge 280 further includes high limit manipulation flag 292 and low limit manipulation flag 293. These manipulation flags 292, 293 may be used by a user to change the set limit values. For example, depending on the authority level of a user, the manipulation flags are fixed to the limit bars such that the user is permitted to manipulate them if authorized. For example, although (as shown in FIG. 7A) only high limit manipulation flag 292 and low manipulation flag 293 are shown extending from the operator set limit values such that limits can be modified by an authorized user, additional manipulation flags may be extended from the ends of the first bar 281 in a like manner so as to allow a user, e.g., an engineer with the proper authority, to modify the engineering hard limit values. Further, such manipulation flags may extend from ends of the delta soft bands 295, 296 to allow a user to modify the optimization soft limits.

The displayed limits and current value for a process variable are shown on a single scale along a single gauge axis 285 to create a uniform frame of reference. Users can make changes to the limits by making traditional text entry changes in textual fields 301–302 and 304–305, or by dragging the manipulation flag 292, 293 along the gauge axis 285. This combination of features encourages meaningful changes in limits because it allows the user to interact with relevant information in a uniform frame of reference.

Figure 7C:
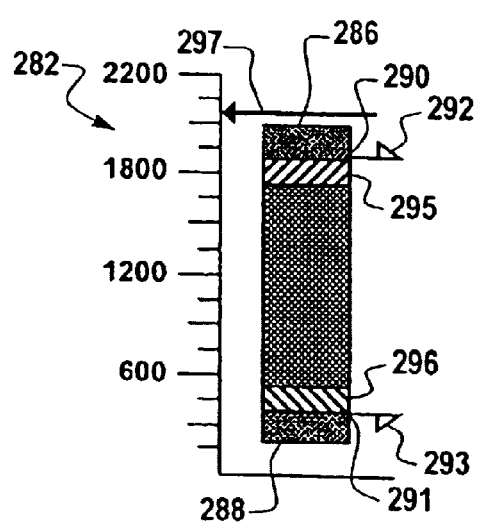

The scale 282 of the process variable gauge 280 automatically adjusts to ensure that the data of the gauge is displayed in a meaningful context. For example, as shown in FIG. 7C, when a process variable current value as represented by arrow 297 is outside of the engineering hard limit range, then the scale 282 will be dynamically recalibrated to show on the scale 282 the range of the operator set limit values plus an additional 20% of clearance. In other words, the scale changed from ending at 2,000 to ending at 2,200. Only one end of the scale 282, where the excursion takes place, is reset and the other graphical elements are adjusted to fit the new scale. The scale 282 will adjust incrementally as the process variable current value continues to stray from the engineering hard limit range. For example, any time the arrow comes within 5% of the end of the scale 282, the range of the scale will be adjusted by an additional 20% of the engineering hard limit range. For example, such an additional resealing is shown in FIG. 7D as the current value approaches 2,160 as shown by pointer 297. The scale range is then increased to 2,640, which is an additional 20% of the previous scale range shown in FIG. 7C.

Color coding of the pointer 297 or other elements of the process variable gauge 280 may be used to reflect relationships between the current value of the process variable and the user defined limits for the process variable. For example, the graphical shape or pointer 297 may be of a particular color, e.g., gray, when the current value of the corresponding process variable is within the high and low engineering hard limit values (see FIG. 7B). Further, when the current value of the corresponding process variable is around one of the pair of the engineering high and low limit values, such as within 1%, then the pointer 297 may be of another color, e.g., yellow (see FIG. 7C). Yet further, when the current value of the corresponding process variable as represented by the current value pointer 297 is outside of the engineering hard high and low limits by at least a certain percentage, then the pointer 297 may be of yet another color, e.g., red (see FIG. 7D).

As shown in FIG. 7D, the current value for the process variable is outside of the engineering hard limits represented by bar 281. In such a case, the engineering physical limits for the process variable may be represented along the gauge axis 285 as shown by the dashed line bar 299. Further, such a bar 299 may be of a particular color alerting the user to such excursions of the current value or the graphical element 299 may be a simple line or pointer on scale 282 representative of the engineering physical limits for the process variable. However, in some manner, the engineering physical limits are represented along gauge axis 285.

Two other illustrative embodiments of cases where the process variable gauge 280 may have a different appearance are when the process variable is a disturbance variable and when the engineering hard limit values are not defined. For example, as shown in FIG. 7E, for a disturbance variable, the process variable gauge 280 is rather simple, comprising just a scale 282 and a pointer 297 for the current value of the disturbance variable. It should be noted that the simplicity of the disturbance variable gauge is a result of the fact that disturbance variables are not controllable, but merely provide the controller information.

FIG. 7F represents an illustrative process variable gauge 280 when engineering hard limit values have not been defined. As shown therein, such limits are simply removed from the process variable gauge 280. The scale 282 when the engineering hard limit values are not defined is based on operator set limits. For example, the scale may be 120% of the range of the operator set limits.

Other illustrative views of process variable gauge 280 are also possible. For example, if a reported value of a process variable is not within the engineering high or low limit range or data is received that is not rational, then the background color may change to a light yellow and/or an arrow may be shown in shadow mode, located at the last known good value. The shadow arrow is used to indicate that the value of the process variable is uncertain. The shadow arrow could represent an analyzer value that was not updated on the current controller iteration, or represent the last known good value for a variable that has lost its signal.

As shown in FIG. 7G, the hashed regions for the delta soft high limit band and delta soft low limit band 295, 296 overlap when the delta soft high limit band plus the delta soft low limit band is greater than the range between the low and high operator set limit values. When this occurs, the two hashed bands will meet at a line positioned at (operator set low limit value)+[(delta soft low limit band)/(delta soft high limit band+delta soft low limit band)]. When such a delta soft overlap occurs, 120 the current value as represented by pointer 297 should optimize at the intersection of the hashed regions, i.e., pseudo set point. As such, the delta soft high and low limit bands may be set to provide for a process variable optimized to a resting value, i.e., pseudo set point, as shown in FIG. 7G. It will be recognized that the range of the delta soft high limit band versus the delta soft low limit band will determine where within the delta soft overlap the current value will optimize. For example, if the delta soft high limit band is twice as large as the delta soft low limit band, the current value will optimize at a position two-thirds up from the operator set low limit in the hashed regions representative of the delta soft overlap as indicated by the above calculation, i.e., (operator set low limit value)+[(delta soft low limit band)/(delta soft high limit band+delta soft low limit band)].

Users can manipulate the limits to which they have access in a variety of ways. For example, at least two are represented herein. Users can use a traditional text entry such as with regard to textual fields 301-302 and 303-304 displayed to the right of the process variable gauge 280. Alternatively, they can use the limit flags 292, 293 to directly manipulate the limits in question. This could, for example, be accomplished by clicking on the limit flag and dragging it to the new value. If the user drags the two operator limit flags to a same value, a single black line will appear with the two limit flags visible. This will be an indicator for set point control. Preferably, the user will not be allowed to drag the operator set low limit flag 293 to a value greater than the operator set high limit flag 292, or vice versa. Regardless of the technique used to make a change, the textual fields to the right of the process variable gauge 280 will turn blue until the Enter or Restore button of the button interface 258 is actuated so as to either implement the change in limits or restore previously displayed limits.

The process variable gauge 280 is used to monitor and manipulate parameters associated with a particular process variable, preferably in a continuous multivariable process. Integrating the representation of relevant information, e.g., bar gauge, and the capability to change controllable parameters, allows a user to make difficult control changes.

Figure 11:
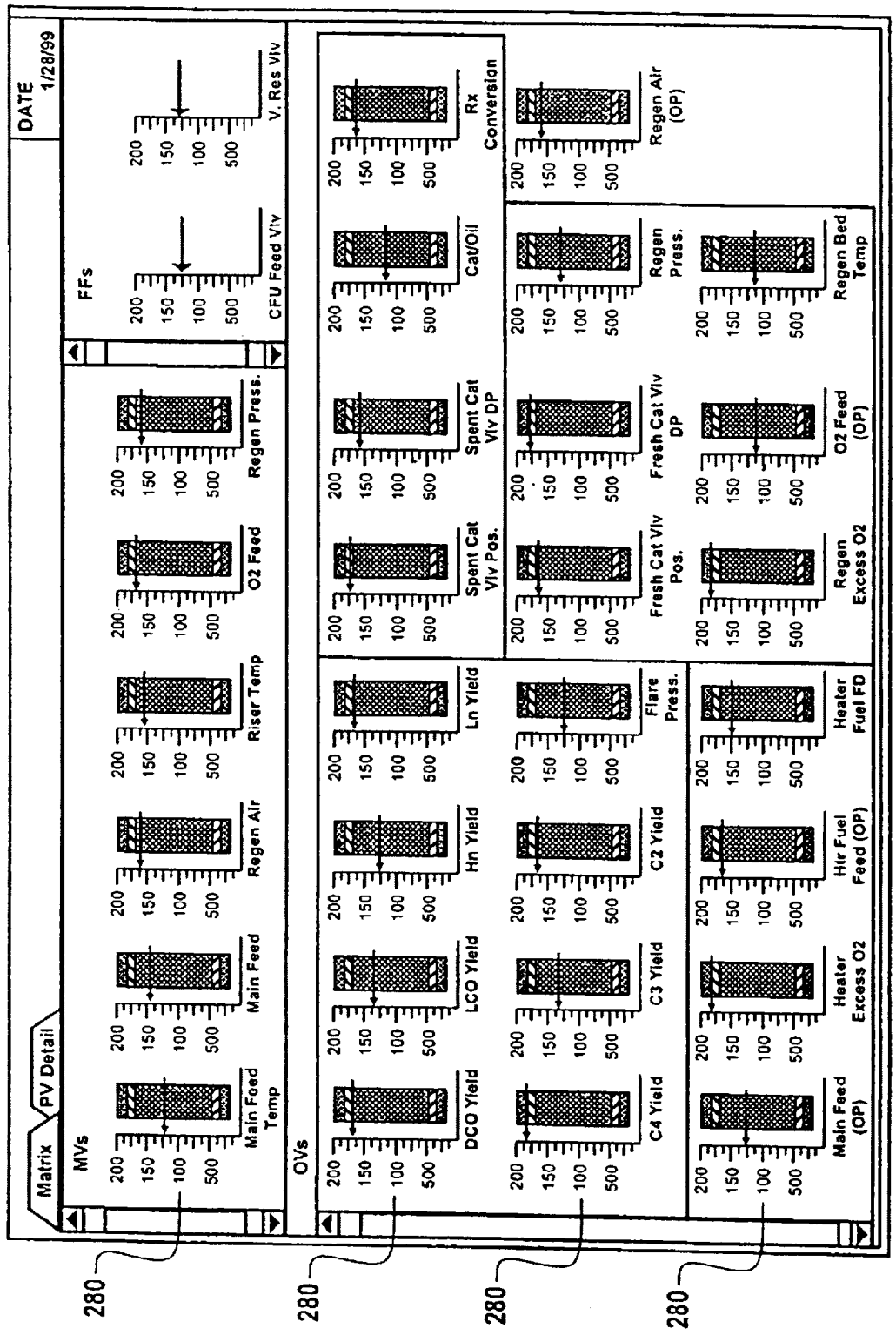
FIG. 11 is a diagram of a process variable detail screen selectable by a user from a plurality of available screens as shown in the display screen of FIG. 3.

Multivariable process matrix display region 200 includes multivariable process matrix display 201 and other displays such as process variable detail as shown and described further herein with reference to FIG. 11. For example, clicking on the matrix tab in the tab section 211 of the region 200 will display matrix display 201, whereas clicking or selecting process variable detail tab of tab region 211 will display the process variable detail display 230 as shown in FIG. 11.

The multivariable process matrix display 201 generally includes a matrix array of information 218 which includes information describing at least one relationship between one or more controlled variables and one or more manipulated variables or information describing one or more characteristics of one or more process variables. Preferably, one or more controlled variables 204 are displayed along a first axis of the matrix array 218 and one or more manipulated variables 206 are displayed along a second axis of the matrix array 218. Further, as shown in FIG. 9, disturbance variables 208 may also be displayed along the same axis with the manipulated variables 206.

The controlled variables 204, and the manipulated variables 206 and disturbance variables 208, are a set of textual labels displayed along the axes of the matrix 218. Preferably, the matrix array of information 218 includes any information which describes a relationship between the controlled variables and the manipulated variables 206, such as gain values, gain delay plots, delay values, direction of influence, etc. More preferably, such information includes gain values 408. A gain value matrix showing the relationship between controlled variables 204 and manipulated variables 206 has been used at least in part in previous displays for use with controllers. For example, as described on page 93 of the Honeywell Users Guide, herein incorporated by reference in its entirety, a matrix array including gain values for a table of manipulated variables, controlled variables, and disturbance variables is shown on a display screen.

Figure 9:
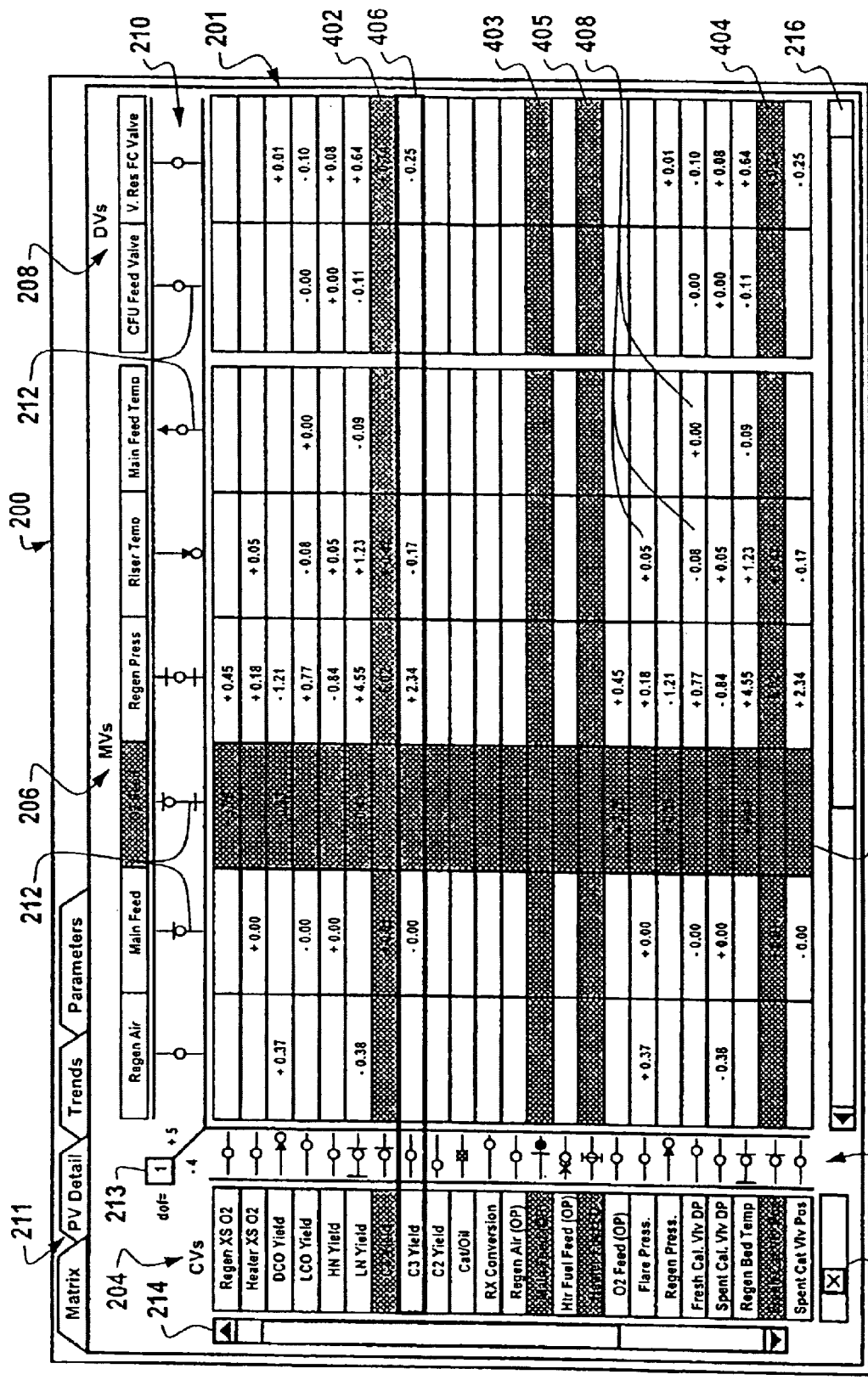
FIG. 9 is a more detailed view of the multivariable process matrix display region such as that generally shown in FIG. 3.

The matrix display 201 as shown in FIG. 9 employs the known gain matrix. For example, such a gain matrix array 218 is a table of steady state gain values 408 between manipulated variables and disturbance variables arrayed by column, relative to each of the controlled variables arrayed by row. The gain values 408 have both a magnitude and sign. To reduce the complexity of the matrix information, the gain values 408 can be replaced by −/0/+ symbols to denote the directional influence that a manipulated or disturbance variable has on a controlled variable without specifying gain magnitude. If the number of column or rows for a large number of process variables exceed the available display space, scroll bars 216 and 214 can be used to provide access to all the process variables.

However, although a gain matrix is known, the present invention provides additional or supplemental elements and/or techniques in combination with the known gain matrix to provide the tools for a user to use the gain matrix effectively. For example, as shown in FIG. 9, process variables selected can be highlighted in the matrix display 201 with a colored rectangle drawn around the entire column or row selected. For example, such a selected process variable is shown by a rectangle 406 constructed around "C3 yield" and its associated row. Such a highlighted row allows a user to focus on a particular process variable and as further described below displays more detailed information regarding the process variable in region 250.

Further, for example, another supplemental graphical tool used with the conventional gain matrix is the use of color to act as a visual cue. For example, under normal conditions, the gain values are displayed in black text on a white background. However, the text color and the background color can be changed to act as visual cues. For example, a grayed-out text in a column or row such as shown by rows 403, 405 indicate that a process variable has been dropped from control. Further, a grayed-out row or column may indicate that a process variable is in a state that is costing the controller a degree of freedom, e.g., the controlled variable constrained to set point or up to a limit value such as shown in rows 402, 404 and column 400. Yet further, for example, column highlighting or row highlighting screens could be selected from a pull-down menu in the toolbar. For example, one option is to display a grayed-out row or column to indicate a variable in a state that is not part of the final solution equation, e.g., a controlled variable not at a constraint or a manipulated variable at a constraint. Further, an alternative option is to highlight the rows and columns associated with variables that the user can make changes to in order to improve the health of the controller (e.g., a manipulated variable at an operator set limit that is inside the engineering hard limits or a controlled variable constrained to set point). In addition, other annotation techniques can be added or current techniques modified to serve user applications.

Further, and preferably, a supplemental graphical tool which forms a part of the multivariable matrix display 201 is the summary gauge display 210. The summary gauge display 210 includes a plurality of graphical devices 212. Each graphical device 212 is representative of at least a state of a corresponding process variable. For example, the graphical device 212 may be any graphical representation of the state of the current value for the process variable it represents. Further, for example, graphical device 212 may even be textual information with regard to the current value of a particular process variable in combination with one or more sets of limit values associated with the process variable.

Preferably, the summary gauge display 210 includes a graphical device 212 for each process variable displayed in the matrix display 201. Preferably, the graphical device is positioned in proximity to the process variable to which it corresponds, e.g., at a position that a user can visually evaluate both the state of the process variable shown by the graphical device 212 and the gain values in the matrix array 218. More preferably, the graphical device 212 is directly adjacent to the textual listing of the process variable, e.g., between the matrix array 218 and the listing of the process variables. More preferably, each of the graphical devices 212 is a summary or generalized graphical device as further described below with respect to FIG. 10.

The matrix display 201 further includes a degrees of freedom indicator 213. The degrees of freedom indicator 213, located in the upper left-hand corner of the matrix display interface 201, provides an indication of the health of the controller. The degrees of freedom indicator 213 includes a diagonal line extending away from the gain matrix 218, a small box at the end of that line, and one-digit on either side of the line. The digit above the line (always expressed as a positive value) is a count of the number of manipulated variables in the controller that are not at a constraint or limit, i.e., manipulated variables that can be use for control of controlled variables. The digit below the line (expressed as a negative value) is a count of the number of controlled variables that are constrained to set points or that are at or outside of constraints, i.e., controlled variables which need to be addressed by the controller 14. The value in the box represents the sum of this positive and negative value and is referred to as the degrees of freedom indicator value. As long as the sum is greater than or equal to 0, the controller can keep the controlled variables at their set points or within their ranges. If the sum becomes a negative value, the background color of the box is preferably turned a particular color, e.g., purple, to indicate that an important transition has taken place.

The ability to make accurate degree of freedom calculations depends upon the identification of steady state gain coefficients between every manipulated variable and disturbance variable and every controlled variable in the controller. This is referred to as a "full matrix". A full matrix is not required for efficient control of the process and is sometimes not obtained for reasons of cost and computational complexity. Therefore, the data required to generate a degrees of freedom display element will not be available in all instantiations of the controller.

An additional feature of the matrix display 201 is the ability to use the matrix display 201 as a blackboard upon which other information can be accessed. For example, because of all the process variables in the controller 14 are represented in the matrix display 201, the matrix display 201 can be used as a navigation tool in the context of a larger interface. The rows and columns can be linked to more detailed information for process variables (e.g., in other display regions) that can be accessed by a selection mechanism, such as the double-click of a mouse. For example, selecting one of the process variables 204, 206, 208 will result in detailed information being displayed in process variable detail and change view display interface region 250 shown on the same screen with the matrix display 201.

In addition, the process variables displayed can be filtered or sorted as a function of one or more characteristics, e.g., characteristics of the process variable such as proximity to limits, optimization characteristics, etc., or characteristics of relationships between process variables such as strongest gain relationship between manipulated variables and controlled variables, positive gain relationships, etc. If sorted as a function of the one or more characteristics, the displayed process variables are reordered in the matrix display, e.g., certain variables being displayed at the top of the listed variables. If filtered, then only certain of the process variables satisfying filtering criteria are displayed in the matrix display.

Further, the matrix display 201 can serve to present information about computational algorithms that run independently. For example, a sensitivity analysis can determine how far a variable process limit can be relaxed before a change in the other process variable values will take place. This sort of information can be mapped onto the matrix display 201 because all the process variables are represented and the gains are important contributors to the algorithm itself. In summary, the matrix display 201 provides an appropriate backdrop for the presentation of useful information for users.

Yet further, matrix display 201 includes a scroll bar 421, or any other manipulatable element, that can be used to change the time frame applicable to the matrix display 201 and the summary graphical display 210. For example, instead of current values being represented by each of the graphical devices 212, a value for a past or future date could be represented.

The matrix display 201 can be used to predict the steady state effect that a change in a manipulated 206 or disturbance variable 208 will have on a controlled variable 204. Such information can help users to understand what might be causing an observed behavior change in a controlled variable or predict the impact that a planned manipulation will have on a controlled variable. To provide such usefulness, preferably, the graphical devices 212 are presented in proximity to their corresponding process variables.

These summary graphical devices 212, which in one embodiment are referred to as bubble gauges, are simple graphical devices that describe the state of a process variable in the context of its control parameters, and optionally, its optimization parameters. Such a simple graphical device 212 is primarily intended to give a user a general sense of the relationship between the current value of a process variable and one or more user defined limits, e.g., the operator set limits and the engineering hard limits for such a process variable. Through the simple presentation of such information, the user is shown summarily where they have room to manipulate limits to assist a constraint-based controller 14 and the user is allowed to evaluate the current status of the process variable in relationship to set limits.

Further, such simple graphical devices 212 can be used to show the current value of a process variable in the context of its optimization objective. This allows the user to evaluate how well this objective is being met by a particular process variable.

Figure 10:
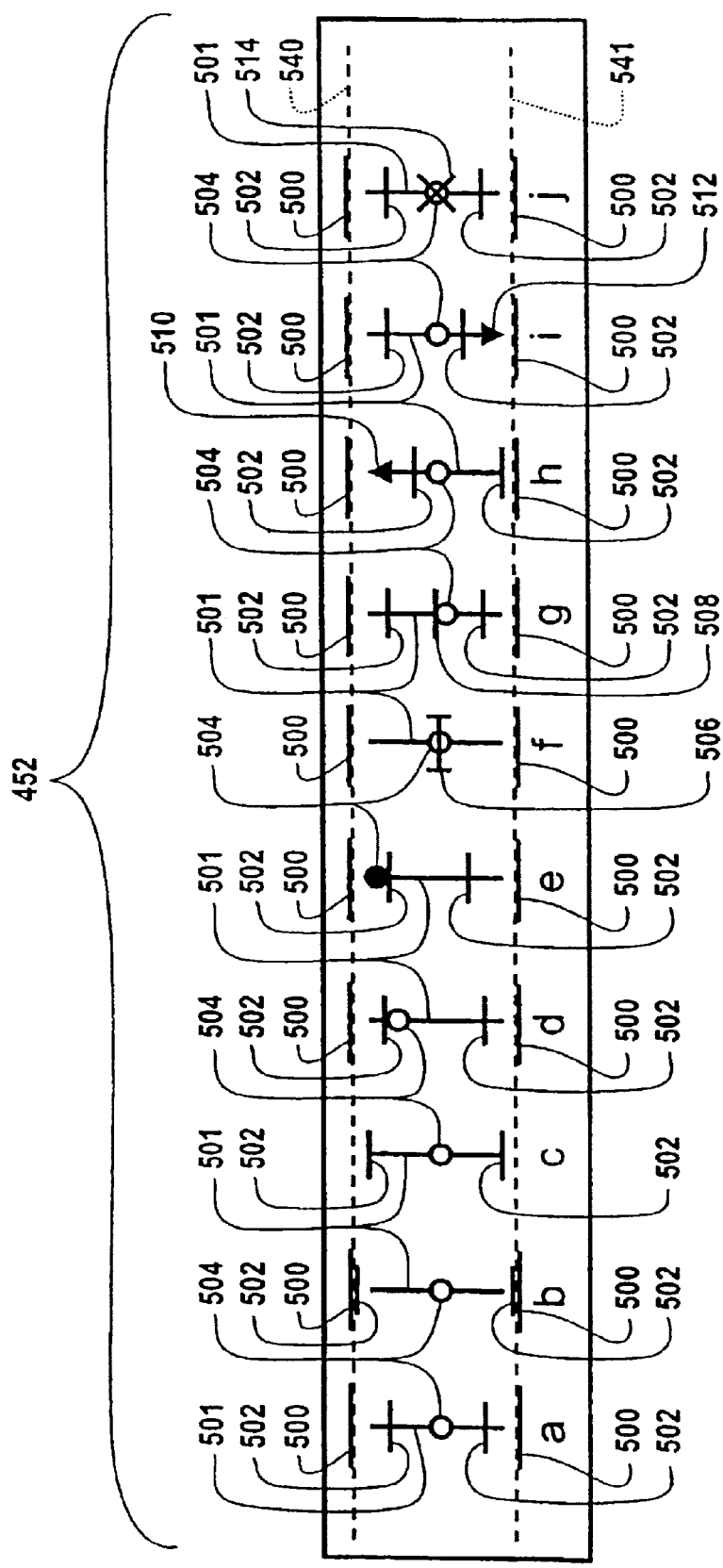
FIG. 10 is a more detailed illustration of a set of summary graphical devices, e.g., bubble gauges, such as used in a matrix display as shown in FIG. 9.

An illustrative set of summary graphical devices 452 is shown in FIG. 10. The set of summary graphical devices 452, e.g., bubble gauges, are illustrative of various states for a process variable. Generally, each of the summary graphical devices 452 includes an axis 501 and at least one pair of high and low limit elements (e.g., 500, 502) displayed on the gauge axis representative of user defined process limit values for a corresponding process variable. A graphical shape 504 (e.g., a small hollow circle in the case of a bubble gauge-type summary graphical device) is used to represent a state, e.g., the current value, of the process variable on the gauge axis 501 relative to the user defined process limit values for the process variable, i.e., the graphical shape 504 is shown on the axis 501 at a position that indicates the process variable's current value. Preferably, the current value of the process variable is represented. However, predicted future values and/or historical values may also be shown in addition to the current value or instead of the current value.

This very simplistic form of representing the state, e.g., the current value, of a process variable relative to one or more sets of limits allows the user to quickly evaluate a particular process variable. Further, in addition to the graphical shape representing the current value of the process variable, a graphical symbol such as that shown in the illustrative summary graphical devices 452h, 452i, and 452j may be used to represent optimization information associated with the process variable corresponding to the graphical device.

The illustrative summary graphical devices 452a–j shall be described in further detail to illustrate the states represented by such illustrative embodiments. Summary graphical device 452a is representative of a normal state where operator set limits 502 and engineering hard limits 500 are shown. For example, such engineering hard limits and operator set limits 502 may be represented by parallel lines extending orthogonal to gauge axis 501. However, one skilled in the art will recognize that such operator set limits 502 and engineering hard limits 500 may be represented by any graphical element simplistic in nature allowing for effective user evaluation. For example, instead of parallel lines, other graphical elements such as triangles, curves, pointers, etc. may be used to illustrate such limits. Graphical shape 504 is shown at a position on the axis 501 representative of the current value of the process variable to which the graphical device corresponds.

Summary graphical device 452b is representative of a normal state wherein operator set limits are set at the engineering hard limits 500. As such, the parallel lines appear generally in double thickness at the outer regions of the summary graphical device along gauge axis 501. Graphical shape 504 is shown at a position on the axis 501 representative of the current value of the process variable to which the graphical device corresponds, e.g., in this illustration, the current value is at the center of the engineering hard limits 500 and operator set limits 502.

Summary graphical device 452c is representative of a normal state for the current value with no engineering hard limits being defined. As such, only one set of parallel lines 502 representing the operator set limits are shown in the summary graphical device 452c. Graphical shape 504 is shown at a position on the axis 501 representative of the current value of the process variable to which the graphical device corresponds, e.g., in this illustration, the current value is at the center of the engineering hard limits 500 and operator set limits 502.

Summary graphical device 452d is representative of a current value within 0.1% of one of pair of operator set limits 502. In such a configuration, the graphical shape 504 is directly adjacent one of the parallel lines representing the operator set limits.

Summary graphical device 452e is representative of a current value for the process variable that is more than 1% beyond the operator set limits 502 but within the engineering hard limits 500. As such, the graphical shape 504 is between an operator set limit 502 and an engineering hard limit 500.

Summary graphical device 452f is representative of a normal current value for the process variable constrained to set point. In such a configuration, the graphical shape 504 is set between the engineering hard limits 500 and on a single tangential line with wing tips 506 drawn to note the location of the set point. It will be recognized that any additional graphical symbol may be used with the graphical shape 504 to denote the location of a set point. For example, a pointer directed at the gauge axis 501 may be used as opposed to the single tangential line with wing tips 506.

Summary graphical device 452g is representative of a process variable in a wound up state. In other words, other process variables, having limits that effect this particular process variable, are up against limits and therefore this particular variable is wound up. A controller 14 can be used to recognize such a wound up process variable state so as to provide an indication to the graphical interface of such an occurrence. As shown in FIG. 10, the wound up state is represented by a dashed line 508 adjacent the graphical shape 504. Graphical shape 504 is shown at a position on the axis 501 representative of the current value of the process variable to which the graphical device corresponds, e.g., in this illustration, the current value is between the engineering hard limits 500 and operator set limits 502. When a wound up state is indicated, the dashed line is drawn next to the graphical shape in the direction the variable cannot move. This state indicates that although the process variable appears to have room to move, it will not because it is wound up (e.g., the downstream control device has reached a physical limit although the controlled variable is within acceptable limits).

Summary graphical devices 452h, 452i, and 452j each include not only states representing the current value of the process variable relative to one or more sets of user defined limits, but also include a graphical symbol representative of optimization information for the particular process variable. Summary graphical device 452h includes engineering hard limits 500, operator set limits 502, and a pointer or arrow 510 directed towards the high limits indicative of a process variable which is to be maximized, or, in other words, a process variable that has a negative linear coefficient.

Summary graphical device 452i is very much like summary graphical device 452h except that the process variable is to be minimized as indicated by the graphical symbol of an arrow or pointing device 512 directed toward the engineering hard low limit, or, in other words, representative of a process variable having a positive linear coefficient.

Summary graphical device 452j includes a graphical shape 504 and further having a graphical symbol 514, e.g., in this case, a cross-hair, indicative that this particular process variable has a non-zero quadratic coefficient indicating that the optimizer is seeking a resting value for the process variable. Graphical shape 504 is shown at a position on the axis 501 representative of the current value of the process variable to which the graphical device corresponds, e.g., in this illustration, the current value is at the center of the engineering hard limits 500 and operator set limits 502.

The end points of the axis 501 for each of the graphical devices 452 are fixed and they reflect one of two scale ranges. If engineer hard limit values are specified, then the scale range is normalized to the range of those values. If the engineering hard limit values are not available, then the scale range is set to reflect the operator set high and low limits +/−20%, respectively. In either case, preferably, limit lines drawn orthogonal to the axis denote the operator set limit values. Generally, engineering hard limits are drawn as dark gray orthogonal lines superimposed on end lines which may extend across multiple graphical devices as shown by lines 540 and 541. Preferably, the lines representative of the operator set limits are shorter than the lines representative of the engineering hard limits.

One skilled in the art will recognize that any graphical shape as opposed to a small hollow circle 504 presented in this illustrative example may be used to show the current value of the process variable in the context of the normalized ranges defined in the context of the user defined limits. Further, color coding may be used in conjunction with the graphical shape just as it has been used in previous illustrative embodiments herein. For example, one color (e.g., gray) of a set of colors may be used to show that the current value of the process variable is between operator set limits (see summary graphical device 452*a*), another color (e.g., yellow) may be used for the graphical shape when the current value for the process variable is near the operator set limits (see summary graphical device 452*d*), and another color (e.g., red) may be used when the current value of the process variable exceeds the operator set limits (see summary graphical device 452*e*).

Use of the summary graphical devices 452 provide for monitoring the behavior of a process variable in the context of its control limits and even its optimization goals. A user can do this by perceiving the position of the graphical shape, e.g., bubble, with respect to its limits, e.g., engineering hard limits or operator set limits. In addition, the user can perceive the relationship between the two sets of limits by looking at the space between the respective high and low values. Further, the user can evaluate optimization performance of the variable using optimization queues and the current value indication, e.g., determine whether or not the variable is acting as expected given its optimization goals. Again, discrepancies between expected and observed behavior can lead the user to investigate further.

Various other matrix arrays of information with regard to multiple process variables may be displayed as shown by the illustrative diagram of FIG. 11. For example, in FIG. 11, a matrix array display 230 of process variable gauges 280 for various manipulated variables, controlled variables, and disturbance variables is shown when a user selects tab "PV Detail" from the tab region 211 shown in FIG. 9. Likewise, upon selection of a "Trend" tab of tab region 211 as shown in FIG. 9, a trends view including several trend history/prediction plots such as those shown in FIG. 6, e.g., plots 252, may be arrayed in parallel in a display view. Likewise, upon selection of "Parameter" tab in tab region 211 as shown in FIG. 9 may provide a view of detail and tuning screens.

All patents and references cited herein are incorporated in their entirety as if each were incorporated separately.

Although the invention has been described with particular reference to preferred embodiments thereof, variations and modifications to the present invention can be made within a contemplated scope of the claims as is readily known to one skilled in the art.

What is claimed is:

1. A graphical user interface for providing real-time process information to a user with regard to a process that is operable under control of one or more process variables, the graphical user interface comprising:

a scale extending along a gauge axis;

one or more bars extending along the gauge axis with the scale, each bar representative of a set of high and low process limit values for a process variable, wherein the one or more bars extending along the gauge axis comprises:

a first bar extending along the gauge axis, wherein a first end of the first bar is representative of an user set engineering hard high limit for the process variable and a second end of the first bar is representative of an user set engineering hard low limit for the process variable, wherein the first end and second end of the first bar representative of the engineering hard high and hard low limits define a range in which operator set high and low limits are set; and a second bar extending along the gauge axis, wherein a first end of the second bar is representative of the operator set high limit for the process variable and a second end of the second bar is representative of the operator set low limit for the process variable, wherein the first end and second end of the second bar representative of the operator set high and low limits define a range in which the process is free to operate, wherein each of the operator set high and low limits are adjustable so as to exert influence on the process; and a graphical shape displayed along the gauge axis representative of a current value of the process variable.

2. The graphical user interface of claim 1, wherein the second bar extending along the gauge axis representative of operator set high and low limits for the process variable extends along the gauge axis within the it bar representative of the engineering hard high and low limits for the process variable.

3. The graphical user interface of claim 2, wherein the one or more bars extending along the gauge axis further comprise a delta soft high region within the second bar and adjacent the first end thereof and a delta soft low region within the second bar and adjacent the second end thereof, and further wherein the delta soft high region and the delta soft low region are representative of a delta optimization range within the operator set high and low limits.

4. The graphical user interface of claim 3, wherein the delta soft high region and the delta soft low region overlap within the second bar to provide for optimization to a pseudo set point.

5. The graphical user interface of claim 1, wherein the graphical user interface further comprises user manipulation elements movable to change one or more of the high and low process limit values.

6. The graphical user interface of claim 5, wherein the scale extending along the gauge axis is automatically adjustable as a function of the movement of the user manipulation elements.

7. The graphical user interface of claim 5, wherein the user manipulation elements comprise one or more manipulation pointer flags associated with operator set limits, the one or more manipulation pointer flags are draggable along the gauge axis to change such operator set limits.

8. The graphical user interface of claim 5, wherein the user manipulation elements comprise one or more manipulation pointer flags associated with the engineering hard limits, the one or more manipulation pointer flags ae draggable along the gauge axis to change such engineering hard limits.

9. The graphical user interface of claim 1, wherein the graphical shape representative of the cent value of the process variable is a pointing device proximate to the scale.

10. The graphical user interface of claim 1, wherein the graphical user interface further comprises at least one additional graphical shape displayed along the gauge axis representative of at least one additional value for the process variable.

11. The graphical user interface of claim 10, wherein the additional graphical shape representative of at least one additional value for the process variable has a color of a set of colors that reflects the state of the current value for the process variable relative to the set of high and low process limit values.

12. The graphical user interface of claim 1, wherein the scale extending along the gauge axis is adjustable as a function of a current value of the process variable relative to the one or more process limits values.

13. The graphical user interface of claim 1, wherein the graphical shape representative of the current value of the process variable has a color of a set of colors that reflects the state of the current value for the process variable relative to the set of high and low process limit values.

14. The graphical user interface of claim 13, wherein a color for the graphical shape represents one of a current value of the corresponding process variable being within the set of high and low process limit values, the current value of the corresponding process variable being within a certain percentage of a limit value of the set of high and low process limit values, and the current value of the corresponding process variable being outside of the set of high and low process limit values.

15. The graphical user interface of claim 1, wherein a background of a region adjacent the one or more bars along the gauge axis is of a color when the graphical shape representative of the current value of the process variable is outside of the high and low process limit values, and further wherein the region is representative of engineering physical limits of the process variable.

16. The graphical user interface of claim 1, wherein the graphical user interface further comprises a trend graph for the process variable.

17. The graphical user interface of claim 16, wherein the trend graph comprises at least one of a historical trend graph and a prediction trend graph for displaying trend information representative of process variable values.

18. The graphical user interface of claim 16, wherein the trend graph comprises at least one of a historical trend graph and a prediction trend graph for displaying trend information representative of process variable limits.

19. The graphical user interface of claim 1, wherein the one or more process variables comprise a plurality of manipulated variables and a plurality of controlled variables of a continuous multivariable process.

20. A computer implemented method for providing a graphical user interface for providing real-time process information to a user for a process that is operable under control of one or more process variables, the method comprising:

displaying a scale extending along a gauge axis;
displaying one or more bars extending along the gauge axis with the scale each bar representative of a set of high and low process limit values for a process variable, wherein displaying one or more bars extending along the gauge axis comprises:
displaying a first bar extending along the gauge axis, wherein a first end of the first bar is representative of an user set engineering hard high limit for the process variable and a second end of the first bar is representative of an user set engineering hard low limit for the process variable; and
displaying a second bar extending along the gauge axis, wherein a first end of the second bar is representative of an operator set high limit for the process variable and a second end of the second bar is representative of an operator set low limit for the process variable;
providing data representative of at least the current value of the process variable;
displaying a graphical shape along the gauge axis representative of the current value of the process variable relative to the set of high and low press limit values; and
adjusting at least one of the high and low limits so as to exert influence on the process.

21. The method of claim 20, wherein displaying one or more bars extending along the gauge axis further comprises displaying a delta soft high region within the second bar and adjacent the first end thereof and a delta soft low region within the second bar and adjacent the second end thereof, and further wherein the delta soft high region and the delta soft low region are representative of a delta optimization range within the operator set high and low limits.

22. The method of claim 20, wherein displaying the one or more bars extending along the gauge axis comprises displaying the second bar extending along the gauge axis representative of the operator set high and low limits for the process variable within the first bar representative of engineering hard high and low limits for the process variable.

23. The method of claim 22, wherein displaying one or more bars extending along the gauge axis further comprises displaying a delta soft high region within the second bar and adjacent the first end thereof and a delta soft low region within the second bar and adjacent the second end thereof, and further wherein the delta soft high region and the delta soft low region are representative of a delta optimization range within the operator set high and low limits.

24. The method of claim 22, wherein displaying the delta soft high region within the second bar and adjacent the first end thereof and a delta soft low region within the second bar and adjacent the second end thereof comprises:

receiving user input representative of the delta values; and
displaying a delta soft high region and a delta soft low region that overlap providing for an optimization pseudo set point within the operator set high and low limits.

25. The method of claim 24, wherein the optimization pseudo set point is proportional to the delta soft high region and delta soft low region.

26. The method of claim 20, wherein the method further comprises:

displaying user manipulation elements movable to change one or more of the high and low process limit values;
moving such user manipulation elements to generate data representative of changed high or low process limit values; and
providing such data to a controller of the process.

27. The method of claim 26, wherein the method further comprises rescaling the scale extending along the gauge axis as a function of the movement of the user manipulation elements.

28. The method of claim 26, wherein moving such user manipulation elements to generate data cores dragging one or more manipulation pointer flags associated with the operator set limits along the gauge axis to change such operator set limits.

29. The method of claim 26, wherein moving such user manipulation elements to generate data comprise dragging one or more manipulation pointer flags associated with the engineering hard limits along the gauge axis to change such engineering hard limits.

30. The method of claim 26, wherein moving such user manipulation elements to generate data comprises dragging one or more manipulation pointer flags associated with the delta soft limits along the gauge axis to change such delta soft limits.

31. The method of claim 20, wherein the graphical shape representative of the current value of the process variable is a pointing device proximate to the scale extending along the gauge axis.

32. The method of claim 20, wherein the method further comprises displaying at least one additional graphical shape along the gauge axis representative of an additional value for the process variable.

33. The method of claim 32, wherein displaying the at least one additional graphical shape comprises displaying at least one additional pointing device proximate to the scale extending along the gauge axis.

34. The method of claim 20, wherein the method further comprises rescaling the scale extending along the gauge axis as a function of the current value of the process variable relative to the set of high and low process limit values.

35. The method of claim 20, wherein displaying the graphical shape representative of the current value of the process variable comprises:
   determining a state of the current value of the process value relative to the set of high and low process limit values; and
   displaying the graphical shape in a color of a set of colors that reflects the state of the current value for the process variable.

36. The method of claim 35, wherein determining the state of the current value of the process value relative to the set of high and low process limit values comprises determining whether the current value of the process variable is within the set of high and low process limit values, determining whether the current value of the process variable is within a certain percentage of a limit value of the set of high and low process limit values, and determining whether the current value of the process variable is a certain percentage outside of the set of high and low process limit values.

37. The method of claim 20, wherein the method further comprises:
   determining whether the current value of the process variable is outside of the set of high and low process limit values; and
   displaying a graphical element representative of engineering physical limits of the process variable when the current value of the process variable is outside the set of high and low process limit values.

38. The method of claim 37, wherein displaying a graphical element representative of engineering physical limits of the process variable comprises displaying a background region adjacent the one or more bars along the gauge axis in a particular color representative of engineering physical limits.

39. The method of claim 20, wherein the method further comprises displaying a trend graph for the process variable with the displayed scale one or more bars, and the graphical shape representative of the current value of the process variable.

40. The method of claim 39, wherein displaying the trend graph comprises displaying at least one of a historical trend graph and a prediction trend graph for the process variable representative of process variable values.

41. The method of claim 39, wherein displaying the trend graph comprises displaying at least one of a historical trend graph and a diction trend graph for the process variable representative of process variable limits.

42. A graphical user interface for providing real-time process information to a user with regard to a process that is operable under control of one or more process variables, the graphical user interface comprising:
   a scale extending along a gauge axis;
   one or more bars extending along the gauge axis, each bar representative of a set of high and low process limit values for a process variable, wherein the one or more bars extending along the gauge axis comprise a fist bar extending along the gauge axis, wherein a first end of the first bar is representative of an operator set high limit for the process variable and a second end of the first bar is representative of an operator set low limit for the process variable, and further wherein the one or more bars extending along the gauge axis further comprise a delta soft high region within the first bar and adjacent the first end thereof and a delta soft low region within the first bar and adjacent the second end thereof, and further wherein the delta soft high region and the delta soft low region are representative of a delta optimization range within the operator set high and low limits; and
   a graphical shape displayed along the gauge axis representative of a current value of the process variable.

43. The graphical user interface of claim 42, wherein the one or more bars extending along the gauge axis further comprise a second bar extending along the gauge axis, wherein a first end of the second bar is representative of an engineering hard high limit for the process variable and a second end of the second bar is representative of an engineering hard low limit for the process variable.

44. The graphical user interface of claim 43, wherein the first bar extending along the gauge axis representative of operator set high and low limits for the process variable extends along the gauge axis within the second bar representative of the engineering hard high and low limits for the process variable.

45. The graphical user interface of claim 42, wherein the delta soft high region and the delta soft low region overlap within the first bar to provide for optimization to a pseudo set point.

46. A computer implemented method for providing a graphical user interface for providing real-time process information to a user for a process that is operable under control of one or more process variables, the method comprising:
   displaying a scale extending along a gauge axis;
   displaying one or more bars extending along the gauge axis, each bar representative of a set of high and low process limit values for a process variable, wherein displaying one or more bars extending along the gauge axis comprises displaying a first bar extending along the gauge axis, wherein a first end of the first bar is representative of an operator set high limit for the process variable and a second end of the first bar is representative of an operator set low limit for the process variable, and wherein displaying one or more bars extending along the gauge axis further comprises displaying a delta soft high region within the first bar and adjacent the first end thereof and a delta soft low region within the first bar and adjacent the second end thereof, and further wherein the delta soft high region and the delta soft low region are representative of a delta optimization range within the operator set high and low limits;

providing data representative of at least the current value of the process variable; and displaying a graphical shape along the gauge axis representative of the current value of the process variable relative to the set of high and low process limit values.

47. The method of claim 46, wherein displaying one or more bars extending along the gauge axis comprises displaying a second bar extending along the gauge axis, wherein a first end of the second bar is representative of an engineering hard high limit for the process variable and a second end of the second bar is representative of an engineering hard low limit for the process variable.

48. The method of claim 46, wherein displaying the one or more bars extending along the gauge axis comprises displaying the first bar extending along the gauge axis representative of the operator set high and low limits for the process variable within the second bar representative of engineering hard high and low limits for the process variable.

49. The method of claim 46, wherein displaying the delta soft high region within the first bar and adjacent the first end thereof and a delta soft low region within the first bar and adjacent the second end thereof comprises:

receiving user input representative of the delta values; and displaying a delta soft high region and a delta soft low region that overlap providing for an optimization pseudo set point within the operator set high and low limits.

50. The method of claim 49, wherein the optimization pseudo set point is proportional to the delta soft high region and delta soft low region.

51. A graphical user interface for providing real-time process information to a user with regard to a process that is operable under control of one or more process variables, the graphical user interface comprising:

a scale extending along a gauge axis;

one or more bars extending along the gauge axis with the scale, each bar representative of a set of high and low process limit values for a process variable, wherein the one or more bars extending along the gauge axis comprise;

a first bar extending along the gauge axis, wherein a first end of the first bar is representative of user set engineering hard high limit for the process variable and a second end of the first bar is representative of an user set engineering hard low limit for the process variable; wherein the first end and second end of the first bar representative of the engineering hard high and hard low limits define a range in which operator set high and low limits are set; and a second bar extending along the gauge axis, wherein a first end of the second bar is representative of the operator set high limit for the process variable and a second end of the second bar is representative of an operator set low limit for the process variable, wherein the first end and second end of the second bar representative of the operator set high and low limits define a range in which the process is free to operate, wherein each of the operator set high and low limits are adjustable so as to exert influence on the process, and further wherein the second bar extends along the gauge axis within the first bar representative of the engineering hard high and low limits for the process variable;

a graphical shape displayed along the gauge axis representative of a current value of the process variable; and user manipulation elements movable to change one or more of the high and low process limit values.

\* \* \* \* \*